(12) United States Patent
Arneson et al.

(10) Patent No.: US 7,844,505 B1
(45) Date of Patent: Nov. 30, 2010

(54) AUTOMATED REAL-TIME DISTRIBUTED TAG READER NETWORK

(75) Inventors: Michael R. Arneson, Westminster, MD (US); William R. Bandy, Gambrills, MD (US)

(73) Assignee: Symbol Technologies, Inc., Holtsville, NY (US)

( * ) Notice: Subject to any disclaimer, the term of this patent is extended or adjusted under 35 U.S.C. 154(b) by 1622 days.

(21) Appl. No.: 09/496,960

(22) Filed: Feb. 3, 2000

Related U.S. Application Data

(63) Continuation-in-part of application No. 09/323,206, filed on Jun. 1, 1999, which is a continuation of application No. 08/975,969, filed on Nov. 21, 1997, now Pat. No. 6,002,344.

(51) Int. Cl.
*G06Q 10/00* (2006.01)
*G08B 5/22* (2006.01)
*G08B 13/14* (2006.01)
*H04Q 5/22* (2006.01)

(52) U.S. Cl. .................. 705/28; 340/10.2; 340/10.4; 340/572.1; 340/825.49

(58) Field of Classification Search ............... 705/28, 705/14; 340/572, 10.2, 10.4, 572.1, 825.49
See application file for complete search history.

(56) References Cited

U.S. PATENT DOCUMENTS

| | | | |
|---|---|---|---|
| 3,520,406 A | 7/1970 | Turner | 209/111.5 |
| 3,689,885 A | 9/1972 | Kaplan et al. | 340/152 T |
| 4,225,953 A | 9/1980 | Simon et al. | 367/117 |
| 4,418,411 A | 11/1983 | Strietzel | 371/67 |
| 4,471,345 A | 9/1984 | Barrett, Jr. | 340/572 |
| 4,495,496 A | 1/1985 | Miller, III | 340/825.54 |
| 4,533,871 A | 8/1985 | Boetzkes | 324/207 |
| 4,598,275 A | 7/1986 | Ross et al. | 340/573 |
| 4,636,950 A | 1/1987 | Caswell et al. | 364/403 |
| 4,656,463 A | 4/1987 | Anders et al. | 340/572 |

(Continued)

FOREIGN PATENT DOCUMENTS

| | | |
|---|---|---|
| DE | 4337637 A | 5/1995 |
| EP | 0467036 | 5/1991 |
| EP | 0 494 114 A2 | 7/1992 |
| EP | 0 496 986 A2 | 8/1992 |
| EP | 0 578 457 A2 | 1/1994 |

(Continued)

OTHER PUBLICATIONS

Notice of Allowance dated Nov. 22, 2005 for US Patent No. 7,035,818, a related application.

(Continued)

*Primary Examiner*—James W Myhre
(74) *Attorney, Agent, or Firm*—Bartholomew DiVita; Michael Giannetta; Terri S. Hughes

(57) ABSTRACT

A method and system for conducting an inventory of items by a network tag reader, wherein a tag is attached to each item and each tag is permanently assigned a tag identification number (Tag ID). A method according to the present invention includes selecting one of a plurality of remote access sensor modules, where the selected remote access sensor module has a coverage pattern that defines a physical area. The method also includes interrogating tags through the selected remote access sensor module. These tags are within the physical area defined by the coverage pattern. As a result of the interrogating step, the network tag reader receives information regarding these tags. This information is stored in a plurality of inventory records.

37 Claims, 28 Drawing Sheets

U.S. PATENT DOCUMENTS

| | | | |
|---|---|---|---|
| 4,799,059 A | 1/1989 | Grindahl et al. | |
| 4,862,160 A | 8/1989 | Ekchian et al. | 340/825.54 |
| 4,931,788 A | 6/1990 | Creswick | 340/825.54 |
| 5,030,807 A | 7/1991 | Landt et al. | |
| 5,124,699 A | 6/1992 | Tervoert et al. | 340/825.54 |
| 5,214,409 A | 5/1993 | Beigel | 340/572 |
| 5,231,646 A | 7/1993 | Heath et al. | |
| 5,245,534 A | 9/1993 | Waterhouse et al. | 705/28 |
| 5,266,925 A | 11/1993 | Vercellotti et al. | 340/572 |
| 5,289,372 A | 2/1994 | Guthrie et al. | 705/28 |
| 5,313,052 A | 5/1994 | Watanabe et al. | 235/375 |
| 5,365,516 A | 11/1994 | Jandrell | |
| 5,365,551 A | 11/1994 | Snodgrass et al. | 375/1 |
| 5,390,360 A | 2/1995 | Scop et al. | 455/34.2 |
| 5,410,315 A | 4/1995 | Huber | 342/42 |
| 5,420,577 A | 5/1995 | Kim et al. | 340/825.52 |
| 5,430,441 A | 7/1995 | Bickley et al. | 340/825.54 |
| 5,434,572 A | 7/1995 | Smith | 342/44 |
| 5,434,775 A | 7/1995 | Sims et al. | 705/8 |
| 5,444,223 A | 8/1995 | Blama | 235/435 |
| 5,446,447 A | 8/1995 | Carney et al. | 340/572 |
| 5,478,991 A | 12/1995 | Watanabe et al. | 235/375 |
| 5,489,908 A | 2/1996 | Orthmann et al. | 342/42 |
| 5,499,017 A | 3/1996 | Beigel | 340/572 |
| 5,500,650 A | 3/1996 | Snodgrass et al. | 342/42 |
| 5,515,053 A | 5/1996 | Hecht et al. | 342/42 |
| 5,519,381 A | 5/1996 | Marsh et al. | 340/572 |
| 5,528,222 A | 6/1996 | Moskowitz et al. | 340/572 |
| 5,528,232 A | 6/1996 | Verma et al. | 340/825.54 |
| 5,530,702 A | 6/1996 | Palmer et al. | |
| 5,537,105 A | 7/1996 | Marsh et al. | 340/825.54 |
| 5,539,394 A | 7/1996 | Cato et al. | 340/825.54 |
| 5,539,775 A | 7/1996 | Tuttle et al. | 375/200 |
| 5,541,928 A | 7/1996 | Kobayashi et al. | 370/95.1 |
| 5,550,547 A | 8/1996 | Chan et al. | 342/42 |
| 5,557,280 A | 9/1996 | Marsh et al. | 342/44 |
| 5,566,441 A | 10/1996 | Marsh et al. | 29/600 |
| 5,576,692 A | 11/1996 | Tompkins et al. | 340/571 |
| 5,583,819 A | 12/1996 | Roesner et al. | |
| 5,583,850 A | 12/1996 | Snodgrass et al. | 370/342 |
| 5,591,951 A | 1/1997 | Doty | 235/435 |
| 5,627,517 A | 5/1997 | Theimer et al. | 340/572 |
| 5,627,544 A | 5/1997 | Snodgrass et al. | 342/42 |
| 5,629,981 A | 5/1997 | Nerlikar | |
| 5,640,151 A | 6/1997 | Reis et al. | 340/825.54 |
| 5,646,607 A | 7/1997 | Shürmann et al. | 340/825.54 |
| 5,648,765 A | 7/1997 | Cresap et al. | 340/825.35 |
| 5,648,767 A | 7/1997 | O'Connor et al. | 340/928 |
| 5,673,037 A | 9/1997 | Cesar et al. | 340/825.54 |
| 5,680,459 A | 10/1997 | Hook et al. | 380/23 |
| 5,686,888 A | 11/1997 | Welles, II et al. | 340/539 |
| 5,686,902 A | 11/1997 | Reis et al. | 340/825.54 |
| 5,689,239 A | 11/1997 | Turner et al. | 340/572 |
| 5,708,419 A | 1/1998 | Isaacson et al. | |
| 5,742,618 A | 4/1998 | Lowe | |
| 5,774,876 A | 6/1998 | Woolley et al. | 705/28 |
| 5,798,693 A | 8/1998 | Engellenner | 340/505 |
| 5,856,788 A * | 1/1999 | Walter et al. | 340/825.54 |
| 5,887,176 A | 3/1999 | Griffith et al. | |
| 5,912,632 A | 6/1999 | Dieska et al. | |
| 5,917,422 A | 6/1999 | Adamec et al. | |
| 5,936,527 A | 8/1999 | Isaacman et al. | |
| 5,959,568 A | 9/1999 | Woolley | |
| 5,963,133 A | 10/1999 | Monjo | |
| 6,002,344 A | 12/1999 | Bandy et al. | 340/825.54 |
| 6,025,780 A | 2/2000 | Bowers et al. | |
| 6,057,756 A | 5/2000 | Engellenner | |
| 6,058,374 A | 5/2000 | Guthrie et al. | |
| 6,097,347 A | 8/2000 | Duan et al. | |
| 6,130,602 A | 10/2000 | O'Toole et al. | |
| 6,215,401 B1 | 4/2001 | Brady et al. | |
| 6,278,698 B1 | 8/2001 | O'Toole et al. | |
| 6,354,493 B1 | 3/2002 | Mon | |
| 6,388,569 B1 | 5/2002 | Engellenner | |
| 6,483,427 B1 | 11/2002 | Werb | |
| 2003/0099210 A1 | 5/2003 | O'Toole et al. | |
| 2005/0156739 A1* | 7/2005 | Maloney | 340/572.1 |
| 2006/0187048 A1* | 8/2006 | Curkendall et al. | 340/572.4 |

FOREIGN PATENT DOCUMENTS

| | | |
|---|---|---|
| EP | 0 585 132 A1 | 3/1994 |
| EP | 0 598 624 A1 | 5/1994 |
| EP | 0598624 A1 | 5/1994 |
| EP | 0 615 285 A2 | 9/1994 |
| EP | 0851239 A1 | 7/1998 |
| GB | 2193359 A | 2/1988 |
| JP | 114072 | 9/1988 |
| WO | WO 93/05485 | 3/1993 |
| WO | 9312513 A | 6/1993 |
| WO | WO 99/26462 | 6/1999 |
| WO | WO 01/26993 | 4/2001 |

OTHER PUBLICATIONS

Notice of Allowance dated Jun. 1, 2005 for US Patent No. 7,035,818, a related application.
Final Office Action dated Jun. 6, 2004 for US Patent No. 7,035,818, a related application.
European Search Report dated Jan. 21, 2004 for European Patent No. EP1320062, a related application.
Final Office Action dated Dec. 1, 2003 for US Patent No. 7,035,818, a related application.
Non Final Office Action dated Apr. 18, 2003 for US Patent No. 7,035,818, a related application.
Final Office Action dated Dec. 17, 2002 for US Patent No. 7,035,818, a related application.
Non Final Office Action dated Jun. 5, 2002 for US Patent No. 7,035,818, a related application.
Wade, Will, "Micron to Acquire ID Tech, ID Micro", Electronic News (1991), Sep. 1, 1997, pp. 16.
Non Final Office Action dated Sep. 18, 2007 for U.S. Appl. No. 10/725,010, a related application.
Final Office Action dated Jan. 30, 2009 for U.S. Appl. No. 10/932,279, a related application.
Non Final Office Action dated Jun. 4, 2008 for U.S. Appl. No. 10/932,279, a related application.
Notice of Allowance dated Nov. 20, 1998 for Canadian Patent No. 2,310,623, a related application.
Office Action date Jan. 2, 2008 for Israeli Application No. 136,220, a related application.
Final Office Action dated Mar. 6, 2009 for Japanese Application No. 2000-521687, a related application.
English Translation of Final Office Action dated Mar. 6, 2009 for Japanese Application No. 2000-521687, a related application.
International Search Report for International Application No. PCT/US98/24829 mailed May 27, 1999.
International Search Report for International Application No. PCT/US01/03054 mailed Apr. 26, 2001.
Interrogation from Japanese Patent Office for Japanese Patent Application No. 2000-521687 mailed Dec. 11, 2009.
English Translation of Interrogation from Japanese Patent Office for Japanese Patent Application No. 2000-521687 mailed Dec. 11, 2009.

* cited by examiner

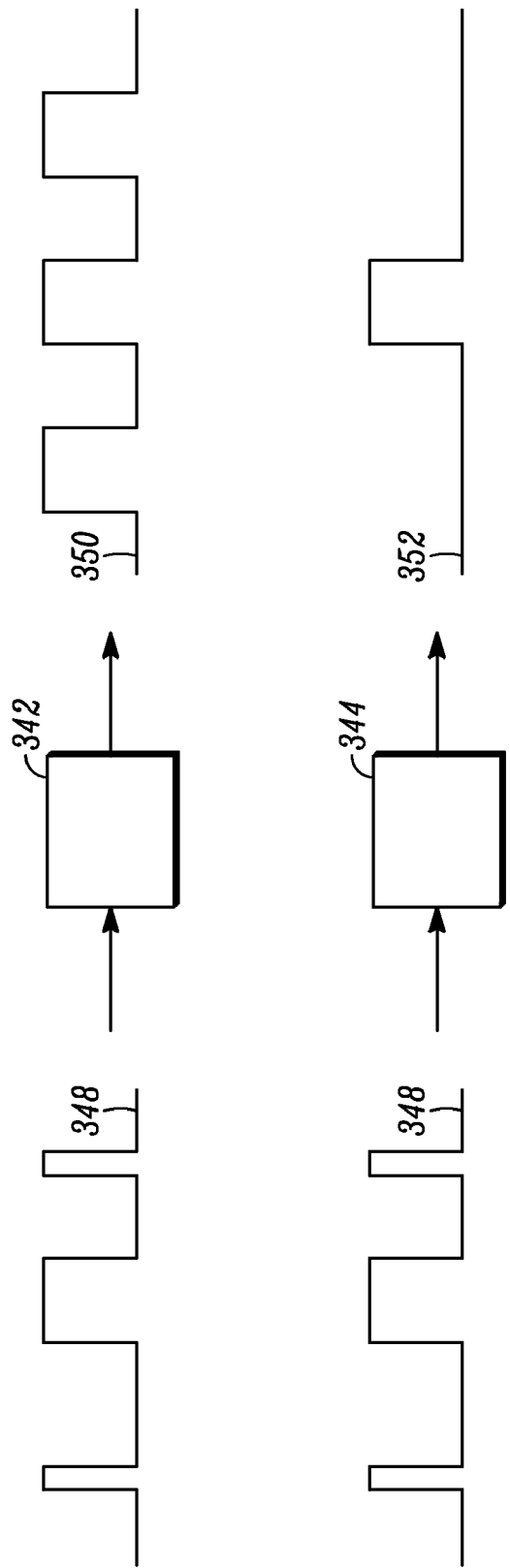

| Tag I.D. | Existing Barcode | Item description |
|---|---|---|
| 1001001001001001001001100001000010 | 08765511155777788897657 | Matrix Movie #001 |
| 1011001101001001001001100001010101 | 08765511155777788897658 | Matrix Movie #002 |
| 1001001101001001101001001000001010101 | 08765511155777788897659 | Matrix Movie #003 |
| 1001001001001001001111001100001111010 | 08765511155777788897660 | Matrix Movie #004 |
| 0011001101001001001001100110110101010 | 08765511155777788897661 | Matrix Movie #005 |
| 1001101101101000010010010010000001010101 | 08765511155777788897662 | Matrix Movie #006 |
| 1011001101001001010001001001101101010101 | 08765511155777788897663 | Matrix Movie #007 |
| 1001101101110100100100101100101010 | 08765511155777788897664 | Matrix Movie #008 |

FIG. 10A

| Tag I.D. | Item Description | Customer | Location | Security Action |
|---|---|---|---|---|
| 1001001001001001001001100001000010 | Matrix Movie #001 | B.A.Jones | A-11a | Accounted |
| 1011001101001001001001100001011010 | Matrix Movie #002 | M.R. Smith | A-11b | Accounted |
| 1001001101001001101001001000001011010 | Matrix Movie #003 | T.S. Evans | A-11c | Accounted |
| 1001001001001001001111001100001111010 | Matrix Movie #004 | J.J. Peterson | A-11d | Accounted |
| 0011001101001001001001101101010101010 | Matrix Movie #005 | P.J. Wilcox | A-11e | M.I.A. |
| 1001101101010001001010001000001011010 | Matrix Movie #006 | M.R. Jenson | A-11f | Accounted |
| 1011001101001001010010010110110101010 | Matrix Movie #007 | P.E. Harold | A-11g | Accounted |
| 1001101101110101001001010001100101010 | Matrix Movie #008 | W.R. Bando | A-11h | Accounted |

AUTOMATED REAL-TIME DISTRIBUTED TAG READER NETWORK

CROSS-REFERENCE TO RELATED APPLICATIONS

This is a continuation-in-part application of the co-pending application entitled "System and Method for Electronic Inventory," U.S. application Ser. No. 09/323,206, filed on Jun. 1, 1999, which is a continuation of a parent application entitled "System and Method for Electronic Inventory," U.S. application Ser. No. 08/975,969, filed on Nov. 21, 1997 (now U.S. Pat. No. 6,002,344, issued on Dec. 14, 1999). These applications and patent are incorporated by reference in their entirety herein.

BACKGROUND OF THE INVENTION

1. Field of the Invention

The present invention relates generally to electronic inventory systems, and more particularly to the use of radio frequency identification (RFID) tags using anti-clash protocols to perform data applications.

2. Description of the Related Art

In modern business, maintaining an accurate inventory of merchandise is crucial. In the past, taking an inventory was an entirely manual process, and therefore slow and expensive. Modern automated inventory systems have improved the accuracy and speed of this process while reducing its cost. With the development of modern manufacturing methods, such as Just-In-Time Delivery, even faster and more accurate inventory methods are required. In some businesses, inventories must be taken almost instantaneously.

One approach to electronic inventory systems is the use of RFID tags. In such systems, an RFID tag is attached to each item to be inventoried. Each tag includes a microprocessor and RF circuitry capable of responding to signals sent from a tag reader. In an ideal inventory system, each tag is assigned a unique tag identification number (Tag ID).

In one such system, the reader transmits a series of clock pulses to the tags. Each clock pulse defines a time slot. Each tag selects a particular time slot using a random number generator and then counts the received time slots. When a given tag's time slot is reached, the tag transmits its Tag ID to the reader. The reader records the received Tag IDs to create an inventory of the tags read.

This approach can suffer from a problem known as "time slot contention." Time slot contention occurs when more than one tag selects the same time slot for Tag ID transmission. When this occurs, the reader is bombarded by more than one tag transmission simultaneously. Because the tag signals interfere with each other, the reader cannot identify the tags.

SUMMARY OF THE INVENTION

The present invention is directed to a method and system for conducting an inventory of items by a network tag reader, wherein a tag is attached to each item and each tag is permanently assigned a tag identification number (Tag ID). A method according to the present invention includes selecting one of a plurality of remote access sensor modules, where the selected remote access sensor module has a coverage pattern that defines a physical area. The method also includes interrogating tags through the selected remote access sensor module. These tags are within the physical area defined by the coverage pattern. As a result of the interrogating step, the network tag reader receives information regarding these tags. This information is stored in a plurality of inventory records. The method performs the above steps for each remote access sensor module. After the above steps are performed for each remote access sensor module, the information stored in the plurality of data records is processed in accordance with a data application. Examples of data applications include location tracking and security monitoring.

BRIEF DESCRIPTION OF THE FIGURES

The present invention will be described with reference to the accompanying drawings.

FIGS. 3B-3D illustrate an implementation of a demodulator and clock recovery circuit.

FIGS. 10A-C illustrate exemplary sets of static and dynamic records.

DETAILED DESCRIPTION OF THE PREFERRED EMBODIMENTS

1. Introduction

The present invention is a system and method for electronic inventory using radio frequency identification (RFID) tags and an anti-clash protocol. The anti-clash protocol solves the above-mentioned problem of time slot contention. The present invention is particularly suited for use in conducting electronic inventories. In particular, the present invention is ideally suited to use for automated real-time inventory control for industries such as distribution and retailing. For example, the present invention enables taking rapid inventories of retail and warehouse items, as well as tracking the location of these items.

The present invention involves the use of an RFID tag that is inexpensive, disposable, and ideally suited to mass production. The RFID tag can be inventoried nearly instantaneously using an unobtrusive, low power radio signal.

Figure 1:
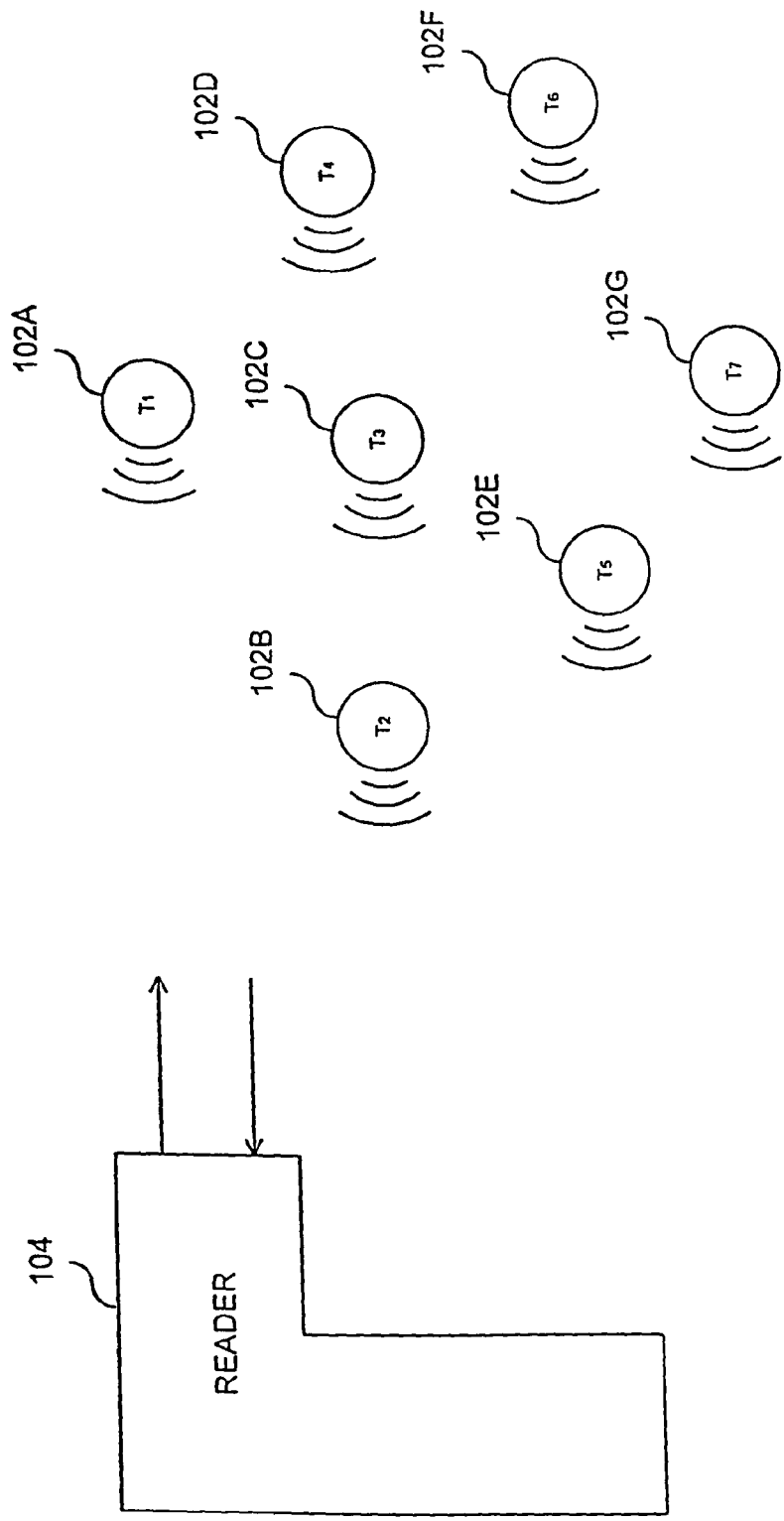
FIG. 1 depicts a tag reader and a plurality of tags according to the present invention for use in an electronic inventory system.

FIG. 1 depicts a tag reader 104 and a plurality of tags 102a-102g for use in an electronic inventory system. In a preferred embodiment of the present invention, each tag is permanently allocated a unique Tag ID. In a preferred embodiment, this assignment takes place at the time of tag manufacture using technologies such as laser-programming or fusible link, which are well-known in the relevant arts. In one embodiment, the Tag ID defines a time slot during which a tag will respond to tag reader 104. The Tag ID can be encrypted for security purposes. In another embodiment, the Tag ID is a separate value. Referring to FIG. 1, tag 102a is assigned to slot $T_1$, tag 102b is assigned time slot $T_2$, and so on.

Each tag is also assigned a manufacturer number, representing the identity of the manufacturer of the tag, and a lot number, representing the manufacturing lot of the tag. In a preferred embodiment, this assignment takes place at the time of tag manufacture. For example, the lot number may specify the date and time of manufacture, the wafer number of the integrated circuit on the tag, etc. In a preferred embodiment, the Tag ID, manufacturer number and lot number are laser-programmed into the tag at the time of tag manufacturer. Therefore, these values are permanently fixed at the time of manufacture and cannot subsequently be changed. The manufacturer number and lot number can be encrypted.

Referring to FIG. 1, in a preferred embodiment of the present invention, tag reader 104 emits a series of clock instructions. Each clock instruction defines a time slot. Tags 102 count the time slots. When the time slot count is equivalent to the Tag ID programmed into a tag, the tag transmits its Tag ID to tag reader 104. In this way, tag reader 104 accumulates the Tag IDs of the inventory tags.

Figure 2:
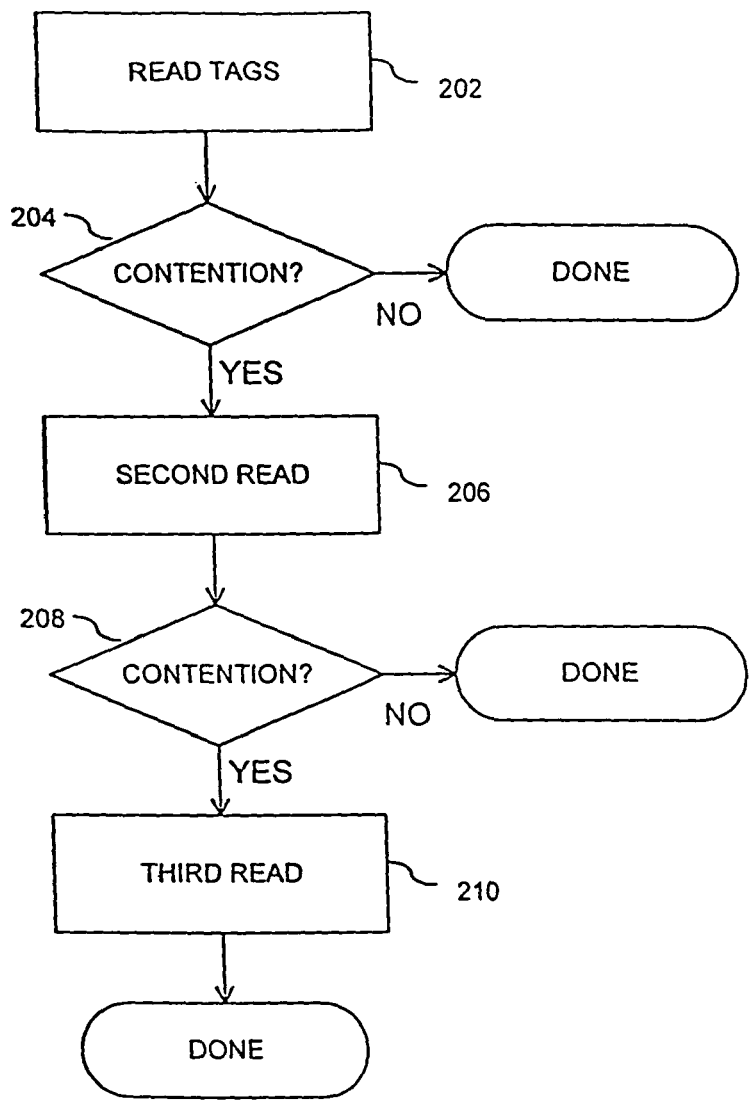
FIG. 2 is a flowchart depicting the operation of the present invention according to a preferred embodiment.

FIG. 2 is a flowchart depicting the operation of the present invention according to a preferred embodiment. The flowchart illustrates the present invention's use of multiple reads and multiple tag identifiers to avoid time slot contention. Referring to FIG. 2, the tags are read for the first time as described above with respect to FIG. 1, and as shown in a step 202. If no time slot contention is detected, as shown by the "no" branch from step 204, then the inventory is complete and accurate.

As described above, time slot contention occurs when multiple tags transmit to the reader in the same time slot. The tag reader can detect this contention in many ways that are well known in the art. For example, each tag could error-code its transmission, for example by using a checksum. When the tag reader receives a tag transmission, it computes a checksum. If two tags transmit simultaneously, the computed checksum will not match the transmitted checksum. When tag reader 104 determines that these checksums do not match, then time slot contention has been detected. Other methods of detecting time slot contention may be employed with the present invention, as would be apparent to one skilled in the art.

If during the first tag read contention was detected, as shown by the "yes" branch from step 204, then a second tag read is performed, as shown in a step 206. While the first tag read was based on Tag IDs, the second tag read is based on a separate value that was permanently programmed into the tag at the time of tag manufacture. In a preferred embodiment, that second value is the manufacturer number of the tag.

During the second read, each contended tag ID is resolved separately. For each contended Tag ID, only those tags that contended for that Tag ID are polled. In the second read cycle, tag manufacturer numbers are used to select the time slot during which the tag will transmit. If no contention is detected in the second read, as shown by the "no" branch from step 208, then the Tag IDs of the tags that contended in the first read have been recorded by the tag reader, and the inventory is complete. However, if time slot contention is detected during the second read, as shown by the "yes" branch from step 208, then a third tag read is performed, as shown in a step 210.

In the third read, each contended manufacturer number is resolved separately. For each contended manufacturer number, only those tags that contended for that manufacturer number are polled. In the third read cycle, a third permanent tag identifier is used to break the contention of the second read. These third identifiers are programmed into each tag at the time of manufacture. In a preferred embodiment, this third value is the lot number of the tag.

In the unlikely event that the third tag read does not resolve all time slot contentions, further similar read operations may be performed without departing from the spirit and scope of the present invention. For example, further tag reads could be based on identification numbers, such as company names or numbers, bar code numbers associated with the item attached to each tag 102, and product identifiers that identify the types of items attached to each tag 102.

Figure 3A:
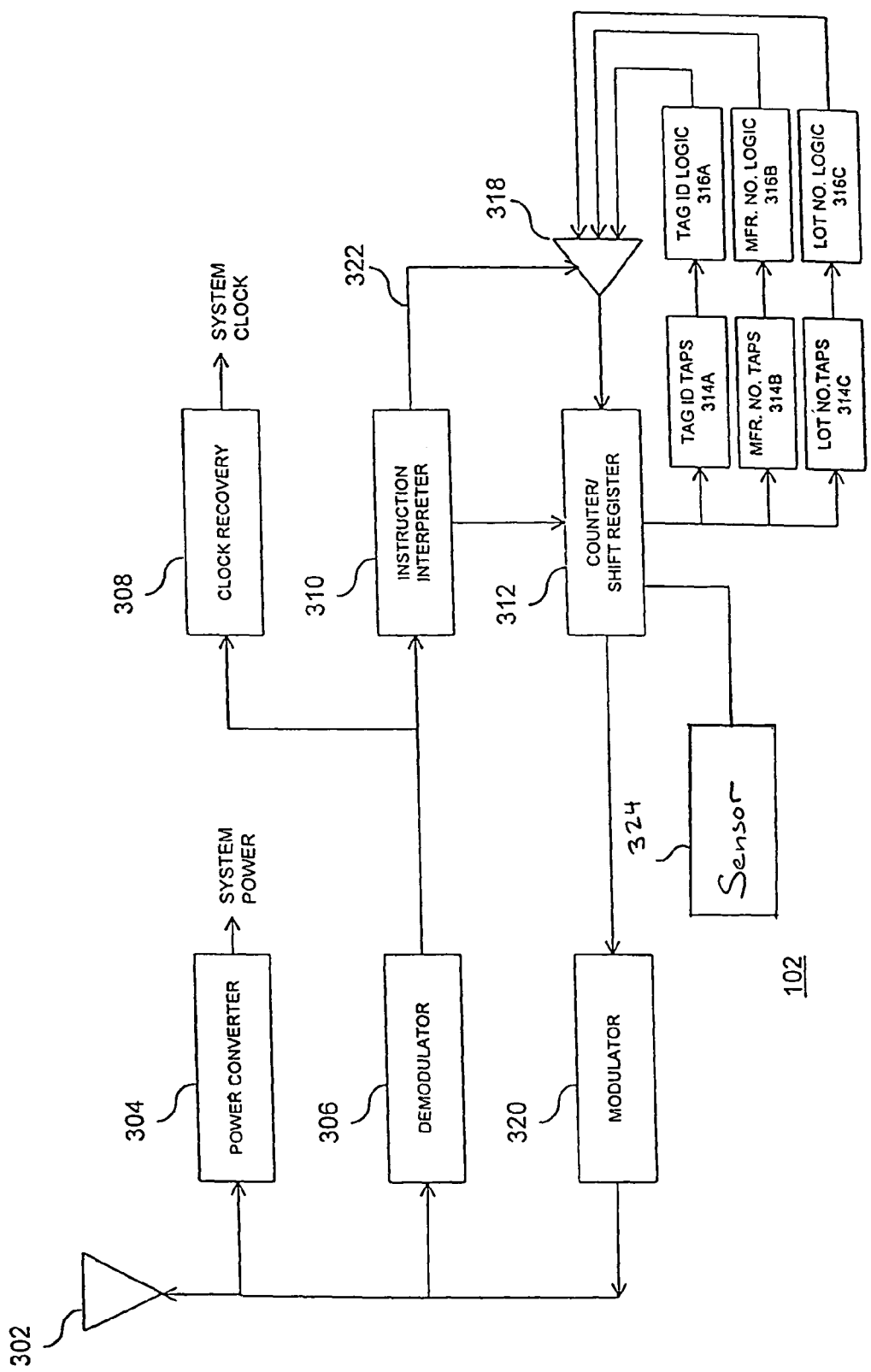
FIG. 3A is a circuit block diagram of an RFID tag according to a preferred embodiment of the present invention.

Now the architecture of the tag is described. FIG. 3A is a circuit block diagram of an RFID tag according to a preferred embodiment of the present invention. The particular circuit of FIG. 3A is presented by way of example only. Other circuits can be employed without departing from the spirit and scope of the present invention, as would be apparent to one skilled in the relevant art. Tag 102 includes at least one antenna 302, a power converter 304, a demodulator 306, a clock recovery circuit 308, an instruction interpreter 310, a counter/shift register 312, a plurality of laser-programmable taps 314a-314c, a plurality of tap decoder logic circuits 316a-316c, a multiplexer 318, and a modulator 320. In a preferred embodiment, antenna 302 is an omnidirectional antenna, with its impedance matched to the frequency of transmission.

In the depicted embodiment, system power for each tag is provided by a charging signal transmitted by the reader prior to the tag reading operation. Power converter 304 is used to convert the received charging signal to system power. Such power converter circuits are well known in the art. In a preferred embodiment, the charging signal need only be present for a short time to fully charge the tags. In an alternative embodiment, power converter 304 is replaced by a battery. In that embodiment, the tag reader 104 is not required to transmit a charging signal.

In an alternate embodiment, power controller 304 is augmented by a storage capacitor. In this embodiment, storage capacitor provides a tag with operating power when it is too far away from the reader to be charged by the charging signal. Also, in an alternate embodiment, power converter can be an energy harvester. Energy harvesting involves capturing RF energy in any portion of the RF spectrum and converting the energy into electrical power signals as opposed to information signals. Energy harvesting is well known to persons skilled in the relevant arts. For a tag 102, energy harvesting properties are determined by the characteristics of antenna 302. A fractal antenna is well suited to both energy harvesting and tag 102 operation, and is well known to persons skilled in the relevant arts.

Demodulator 306 receives signals from tag reader 104 via antenna 302. In a preferred embodiment, the received signals comprise a charging signal and one or more instructions. These instructions are described in detail below. One such instruction includes a count instruction that instructs the tags to increment their counter/shift registers 312. In one embodiment, the count instruction causes counter/shift registers 312 to increment by one; in alternative embodiments, the instruction causes counter/shift registers 312 to increment by other values.

In a preferred embodiment, the instructions are transmitted by tag reader 104 using a phase-modulated RF signal using a several hundred kilohertz baud rate and a 900 megahertz carrier frequency. Tag reader 104 may vary the bit rate of these transmissions. For example, tag reader 104 may reduce the bit rate if it senses the existence of a noisy RF environment. The instructions are sent by the reader with a "return to center" data format; this format is well-known in the art. The instructions are decoded by the tag to generate digital input for instruction interpreter 310 and a system clock. The system clock is recovered by clock recovery circuit 308.

Figure 3B:
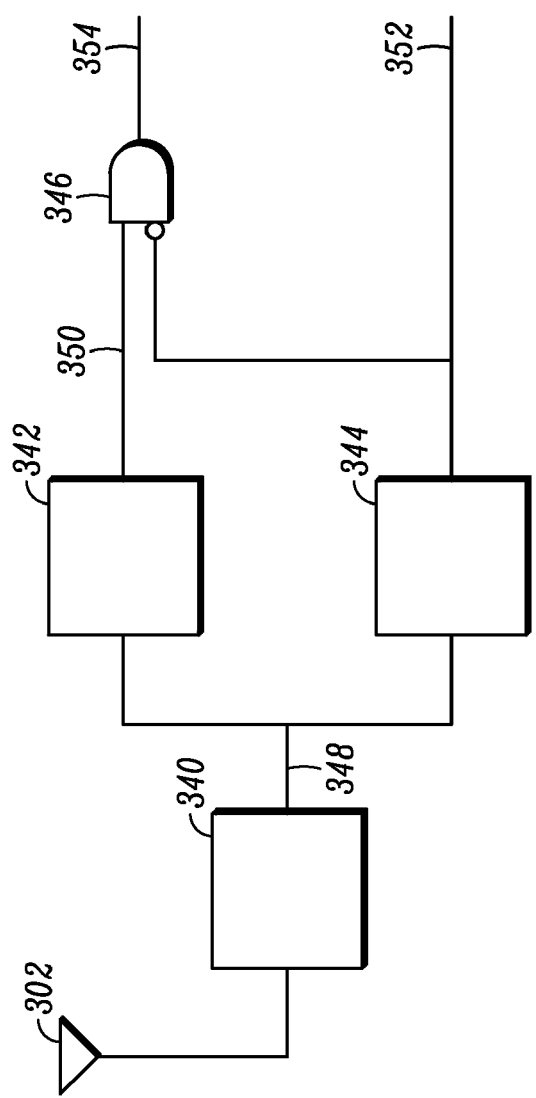

FIG. 3B illustrates an implementation of demodulator 306 and clock recovery circuit 308. This implementation comprises a waveform detector 340, a first detector 342, a second detector 344, and a logic gate 346.

Waveform detector 340 receives an RF signal from antenna 302 and converts this signal into a baseband signal 348. In addition, waveform detector 340 monitors the ambient RF environment. If waveform detector detects spurious RF above an interference threshold, it will wait before outputting a baseband signal 348. Waveform detector 340 can be implemented through RF receiver designs well known to persons skilled in the relevant arts.

Baseband signal 348 comprises a series of pulses, wherein a short pulse represents a logical "0" and an extended pulse represents a logical "1". According to a preferred embodiment, each pulse indicates the transition from a presence of RF energy to an absence of energy in the RF signal received by waveform detector 340. However, in alternate embodiments, the pulses in baseband signal 348 may represent other occurrences in the RF signal.

According to this implementation, a clock signal is generated from a rising edge of each pulse. Baseband signal 348 is input to first detector 342 and second detector 344.

First detector 342 generates a first output signal 350. First output signal 350 comprises an extended pulse for each pulse, whether short or extended, in baseband signal 348. In essence, first detector 342 generates a periodic clock signal comprising a series of extended pulses. Thus, the circuit illustrated in FIG. 3B performs the function of clock recovery circuit 308.

Second detector 344 generates a second output signal 352. Second output signal 352 comprises an extended pulse for each extended pulse in baseband signal 348.

FIG. 3C illustrates an exemplary baseband signal 348 and the corresponding first and second output signals 350-352. As illustrated, this exemplary baseband signal 348 comprises a first short pulse followed by an extended pulse and a final short pulse. In response to baseband signal 348, first output signal 350 and second output signal 352 have different characteristics. First output signal 350 comprises three extended pulses that correspond to each of the pulses in baseband signal 348. As stated above, this signal is a periodic clock signal. Second output signal 352 comprises a single extended pulse that corresponds to the extended pulse in baseband signal 348.

Figure 3D:
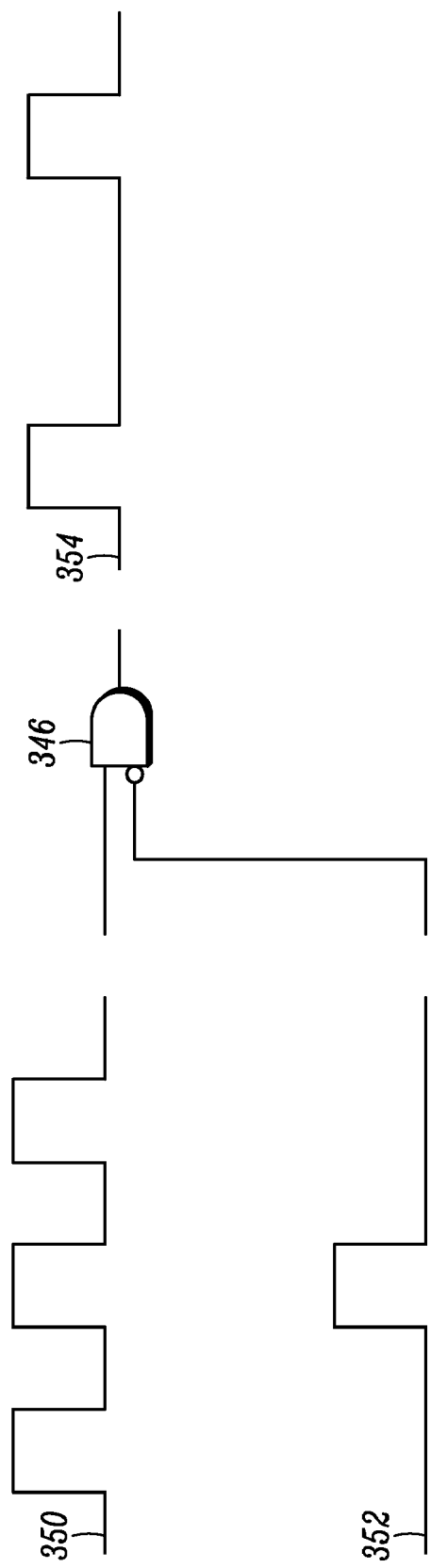

According to the present invention, each pulse in second output signal 352 indicates a logical "1" received from reader 104. In contrast, each pulse in third output signal 354 indicates a logical "0" received from reader 104. Third output signal 354 is generated by inputting first output signal 350 and an inverted second output signal 352 into logic gate 346. In a preferred embodiment, logic gate 346 is an AND gate. Second output signal 352 is inverted according to techniques well known to persons skilled in the relevant arts. FIG. 3D illustrates an exemplary third output signal 354 that corresponds to the exemplary first and second output signals described above. Third output signal 354 comprises a pulse corresponding to the first and third pulses in first output signal 350. In essence, third output signal 354 recovers a logical "0" in baseband signal 348.

Instruction interpreter 310 receives instructions from demodulator 306, and provides control signals and data to counter/shift register 312 and multiplexer 318. Laser programmable taps 314a-314c are permanently programmed with predetermined values at the time of tag manufacture. In a preferred embodiment, taps 314a-314c are programmed by laser-cutting or linking specific output taps of a collection of inverters. As would be apparent to one skilled in the relevant arts, other technologies can be used to permanently program these values without departing from the scope of the present invention. In a preferred embodiment, taps 314a are programmed with the Tag ID, taps 314b are programmed with the tag manufacturer number and taps 314c are programmed with the tag lot number.

Decoder logic circuits 316a-316c are used to monitor the outputs of programmable taps 314a-314c. For example, when the value in counter/shift register 312 is, the same as the value programmed into Tag ID taps 314a, Tag ID logic 316a decodes a Tag ID enable signal, which is provided to multiplexer 318.

Control line 322 is used by instruction interpreter 310 to indicate to multiplexer 318 which read cycle is being executed (that is, which permanently-programmed tag value is being tested). For example, during the second read cycle, the manufacturer number is being tested. When the counter/shift register 312 reaches the manufacturer number programmed into manufacturer taps 314b, manufacturer number logic 316b provides an enable signal to multiplexer 318. This enable signal is selected by control line 322 to cause shift register 312 to shift its contents (the Tag ID) to modulator 320 for transmission to tag reader 104.

As will be described below, the second read cycle is initiated by providing a second read instruction to instruction interpreter 310. In response to that instruction, instruction interpreter indicates to multiplexer 318 that the manufacturer number is being tested. In response, multiplexer 318 gates only the manufacturer number enable signal to counter/shift register 312. This enable signal causes counter/shift register 312 to shift the count, which is equivalent to the manufacturer number, to modulator 320 for transmission to the reader. In this way, the manufacturer number of a tag is transmitted to tag reader 104 when the count reaches the manufacturer number. Thus, the time at which the tag transmits during the second read cycle is controlled by the tag manufacturer number. As further described below, this mechanism is used to solve time slot contention problems.

Modulator 320 transmits the data provided by counter/shift register 312 to tag reader 104 via antenna 302 using amplitude-modulated (AM) RF back scatter signals. In a preferred embodiment a several hundred kilohertz baud rate is used with a 900 megahertz carrier frequency. Because the tag system clock is derived from the signal provided by the tag reader, the data sent by the tag to the reader is clock-synchronized with the reader.

In one embodiment, tag 102 also contains one or more sensors 324. Data collected by sensors 324 is routed to counter/shift register 312 each time tag 102 transmits. The sensor data is appended to the tag transmission and recorded by tag reader 104. In one embodiment, sensor 324 is a gas sensor that detects the presence of chemicals associated with drugs or precursor chemicals of explosives, such as methane. A tag equipped with such a sensor is a powerful mechanism for quickly locating items containing contraband or explosives. In another embodiment, sensor 324 is a temperature detector that generates information indicating the ambient temperature of tag 102. In a further embodiment, sensor 324 is an accelerometer that generates information indicating movement and vibration of tag 102. Such sensors are well known to persons skilled in the relevant arts.

An optical sensor is another example of sensor 324. Optical sensors detect the presence (or absence) of light. Certain optical sensors can detect light of certain colors. Color detection enables a tag 102 to perform functions such as monitoring whether a traffic light at a traffic intersection is red, yellow, or green.

Sensor 324 may also be a pressure sensor. Pressure sensors can detect fluid pressure, atmospheric pressure, or any pressure acting on tag 102. Other examples of sensor 324 include an electrical field sensor, a magnetic field sensor, a radiation sensor, and a biochemical sensor. Sensor 324 may be implemented as a microsensor that is produced using integrated circuit fabrication technologies and/or micromachining. Micromachining is a set of processes which produces three-dimensional microstructures using the same photographic techniques and batch processing as for integrated circuits. Micromachining involves producing three-dimensional microstructures using photographic techniques and batch processing methods similar to those used in the production of integrated circuits.

Figure 4:
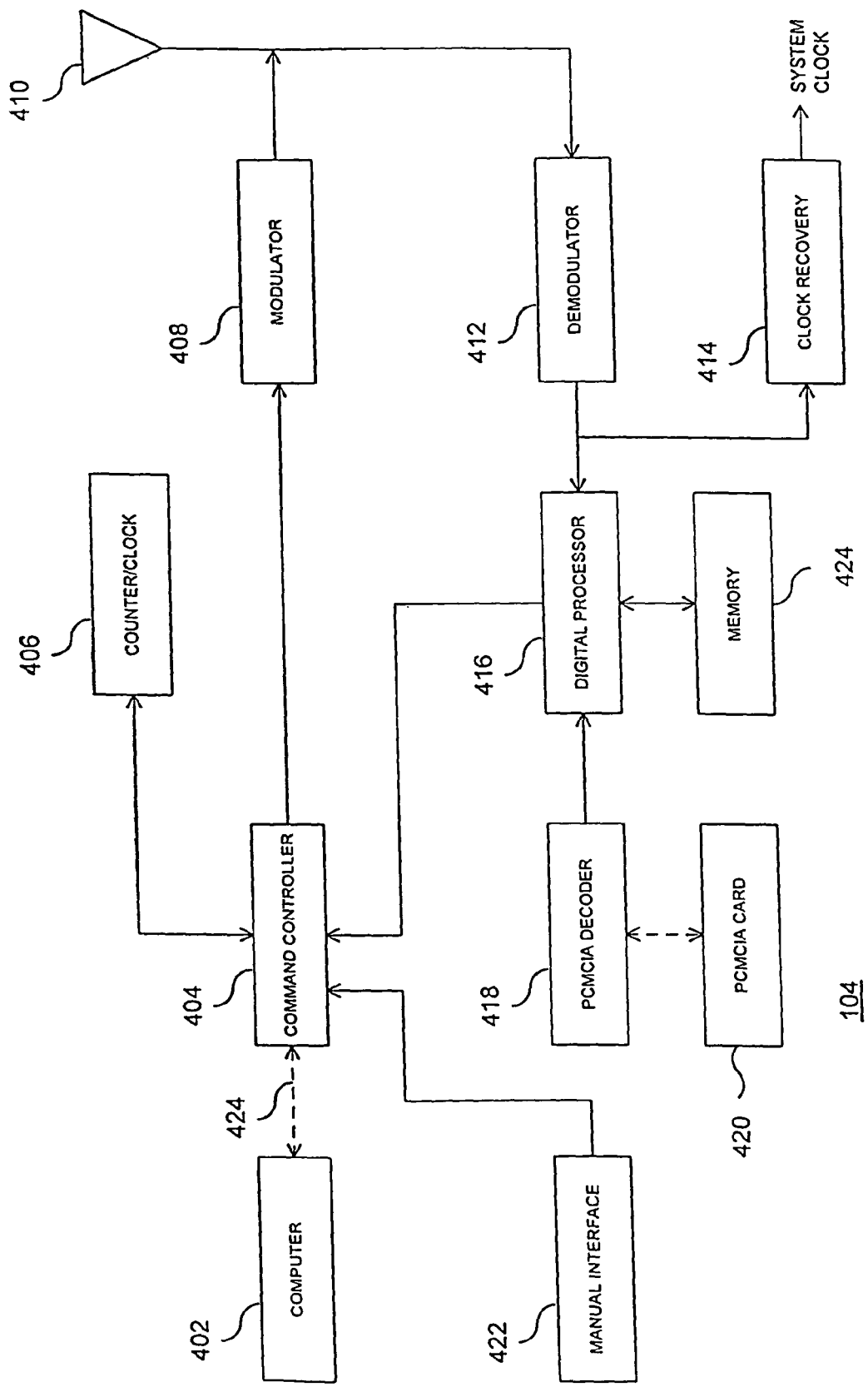
FIG. 4 is a circuit block diagram of the architecture of tag reader 104 according to a preferred embodiment.

The architecture of tag reader 104 is now described. FIG. 4 is a circuit block diagram of the architecture of tag reader 104 according to a preferred embodiment. The circuitry of tag reader 104 is described in three categories: generic circuitry, processing circuitry, and application-specific circuitry.

Referring to FIG. 4, tag reader processing circuitry is represented by computer 402. Computer 402 performs high level processing functions not provided by tag reader generic circuitry. These high level functions include compiling inventory lists, handling time slot contentions, and the like, as would be apparent to one skilled in the relevant arts. Computer 402 may be physically co-located with tag reader 104, as in the case of a stationary tag reader, or may be physically separate from tag reader 104, as may be the case with a hand-held or portable tag reader. The connection 424 between computer 402 and command controller 404 may be hard-wired or wireless.

Application-specific tag reader circuitry is represented by PCMCIA (Personal Computer Memory Card International Association) card 420. In a preferred embodiment, details regarding specific tags, applications, encryption scheme, sensor configuration and data, and modes of operation to be used can be embodied in PCMCIA card 420. In this embodiment, a generic tag reader 104 can be used for multiple inventory applications by merely using different PCMCIA cards.

The remaining circuitry in FIG. 4 comprises tag reader generic circuitry. This is the circuitry required by tag reader 104 to perform generic functions under the control of computer 402 and one or more PCMCIA cards 420. Generic tag reader circuitry includes command controller 404, counter/clock 406, modulator 408, one or more antennas 410, demodulator 412, clock recovery circuit 414, digital processor 416, memory 424, PCMCIA decoder 418, and manual interface 422.

In a preferred embodiment, tag contention is not addressed immediately after it occurs, but rather is resolved in a further read cycle. When a tag contention is detected, tag reader 104 stores the contended time slot number in memory 424. In a further read cycle, tag reader 104 retrieves each contended time slot number from memory 424 for resolution. To keep track of the time slots, tag reader 104 employs a clock/counter 406. Clock/counter 406 responds to the count instructions transmitted by tag reader 104 to tags 102. In this way, the contents of clock/counter 406 are the same as the contents of counter/shift register 312 in each tag 102. Thus, when tag reader 104 detects time slot contention, it can record the contended time slot number by storing the contents of clock/counter 406.

Command controller 404 generates data and instructions under the control of computer 402. These data and instructions are transmitted via modulator 408 and antenna 410 to tags 102. Tag transmissions are received via antenna 410 and demodulator 412 by digital processor 416, which communicates with computer 402 via command controller 404. In one embodiment, a system clock may be derived by clock recovery circuit 414 for use in analyzing tag transmissions. The PCMCIA card 420 is coupled to tag reader 104 via a PCMCIA decoder 418. A manual interface 422 provides the operator with control over the tag reader 104.

2. Modes of Operation

2.1 Timed Broadcast Read

Figure 5:
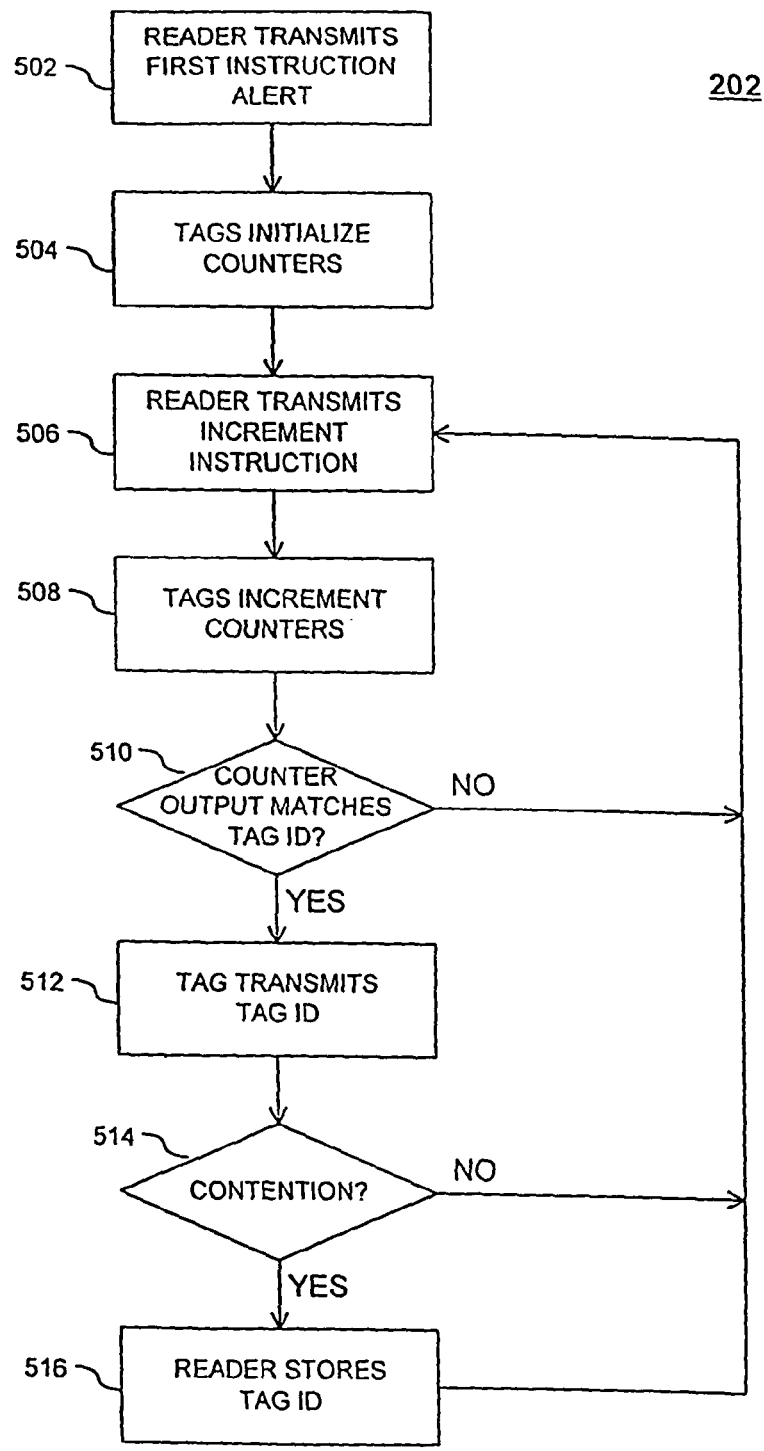
FIG. 5 is a flowchart depicting a first read operation of a timed broadcast read of the present invention.

As described above, the present invention provides at least three modes of operation: timed broadcast read, immediate read, and specific tag read. Timed broadcast read allows an ensemble of tags (from a few to several thousand) to be read within a time frame of a few seconds. FIG. 2 is a high-level flowchart of the timed broadcast read mode of operation of the present invention. FIG. 5 is a flowchart depicting the first read operation of the timed broadcast read of the present invention. During the first read operation, the tag reader steps the tags through a sequence of time slots. When a tag detects that a time slot matches its preprogrammed time slot, the tag transmits its Tag ID. If more than one tag transmits in the same time slot, the tag reader stores the time slot number for future resolution of the time slot contention.

2.1.1 First Read Cycle

Referring to FIG. 5, the timed broadcast read mode of operation begins when the tag reader transmits a first instruction alert to the tags, as shown in a step 502. The first instruction alert signals to the tags that this is the first instruction in the timed broadcast read mode of operation. In response, the tags initialize. In particular, the tags initialize their counters/shift registers 312, as shown in a step 504. The tag reader then repeatedly transmits a clock increment instruction, as shown in a step 506. In response to the increment instruction, each tag increments the count in its counter/shift register 312, as shown in Step 508. When a tag's counter/shift register 312 output matches the Tag ID programmed into Tag ID taps 314a, as indicated by the "yes" branch from step 510, the tag transmits its Tag ID as shown in a step 512 and described above.

In an alternative embodiment, the tag does not transmit its Tag ID, but instead transmits a simple response signal, when a tags counter/shift register 312 output matches the Tag ID programmed into Tag ID taps 314a. The response signal need not convey any information describing the identity of the tag. Indeed, the response signal need not convey any information at all. The response signal need only indicate that a tag is present. In this embodiment, tag reader 104 keeps track of the count in the tag counter/shift register 312 by using an internal counter/clock 406. Counter/clock 406 is initialized in step 504, and is incremented in step 508 in response to the transmitted clock instruction. When tag reader 104 receives a response signal, tag reader 104 records the count in counter/clock 406. Because the tag transmitted the response signal when the count in its counter/shift register 312 equaled its Tag ID, and because the counter/clock 406 also contains that count, the presence of the particular tag that transmitted the response signal is recorded by recording the count in counter/clock 406. In a preferred embodiment, the response signal contains sufficient information for tag reader 104 to detect response signal contention when it occurs.

If more than one tag transmits in the same time slot, tag reader 104 detects time slot contention. If time slot contention is detected, as shown by the "yes" branch from step 514, tag reader 104 stores the Tag ID, as shown in a step 516. Tag reader 104 keeps track of the Tag ID using counter/clock 406. Tag reader 104 will use the Tag IDs to resolve the time slot contention for those Tag IDs in a second read cycle, which is described below and corresponds to step 206 in FIG. 2.

2.1.2 Second Read Cycle

Figure 6:
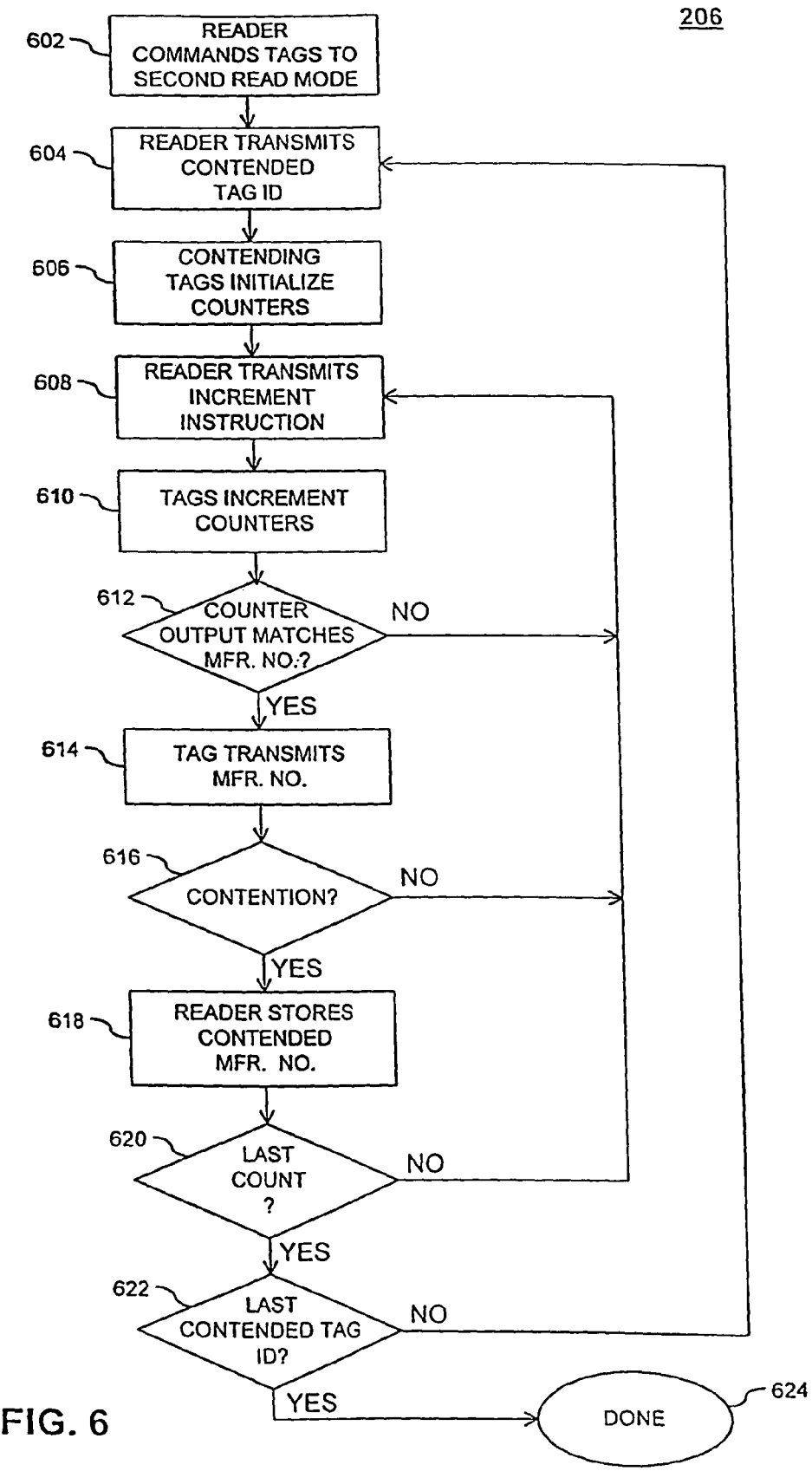
FIG. 6 is a flowchart depicting a second read operation of a timed broadcast read of the present invention.

In a preferred embodiment, the present invention employs a second read cycle to solve time slot contentions that occurred during the first read cycle. FIG. 6 is a flowchart depicting the operation of the present invention in the second read cycle according to a preferred embodiment. During the second read cycle, the system examines contentions for each Tag ID individually. For each contended Tag ID, tag reader 104 causes tags 102 to count in unison. When a tag's count matches its manufacturer number, the tag transmits that manufacturer number. In this way, the tag's manufacturer number controls the time slot during which the tag transmits. Because it is highly unlikely that more than one tag will have the same Tag ID and manufacturer number, it is unlikely that two tags will transmit in the same time slot during the second read. Therefore, Tag ID contention is resolved by the second read. In the unlikely event that multiple tags have the same Tag ID and manufacturer number, contention can be resolved using a third read cycle, as described below.

Referring to FIG. 6, tag reader 104 initiates the second read cycle by sending a second read mode instruction to tags 102, as shown in a step 602. The reader then transmits a contended Tag ID to the tags, as shown in a step 604. The step permits only those tags that contended for a particular Tag ID to participate in contention resolution for that Tag ID. In response to the transmission of the contended Tag ID, only those tags having that Tag ID initialize their counters/shift registers 312, as shown in a step 606.

Tag reader 104 then transmits the first in a series of increment instructions, as shown in a step 608. In response, the contending tags increment their counter/shift registers 312, as shown in a step 610. When the output of a tag's counter/shift register 312 matches the tag manufacturer number permanently programmed into manufacturer number taps 314b, as indicated by the "yes" branch from step 612, the tag transmits its manufacturer number, as shown in a step 614.

In an alternative embodiment, the tag transmits a simple response signal as described above. Tag reader 104 then records the tag's manufacturer number by storing the count in its counter/clock 406, as described above for the Tag ID.

If more than one tag transmits its manufacturer number simultaneously, tag reader 104 detects the contention, as indicated by the "yes" branch from step 616, and tag reader 104 stores the contended manufacturer number for future contention resolution in a third read cycle, as shown in a step 618.

Tag reader 104 steps tags 102 through a predetermined range of possible manufacturer numbers. When the last count is reached, as indicated by the "yes" branch from step 620, the process of steps 604 through 618 is repeated for the next contended Tag ID. When the last contended Tag ID has been examined, as indicated by the "yes" branch from step 622, the second read cycle is complete.

2.1.3 Third Read Cycle

Figure 7:
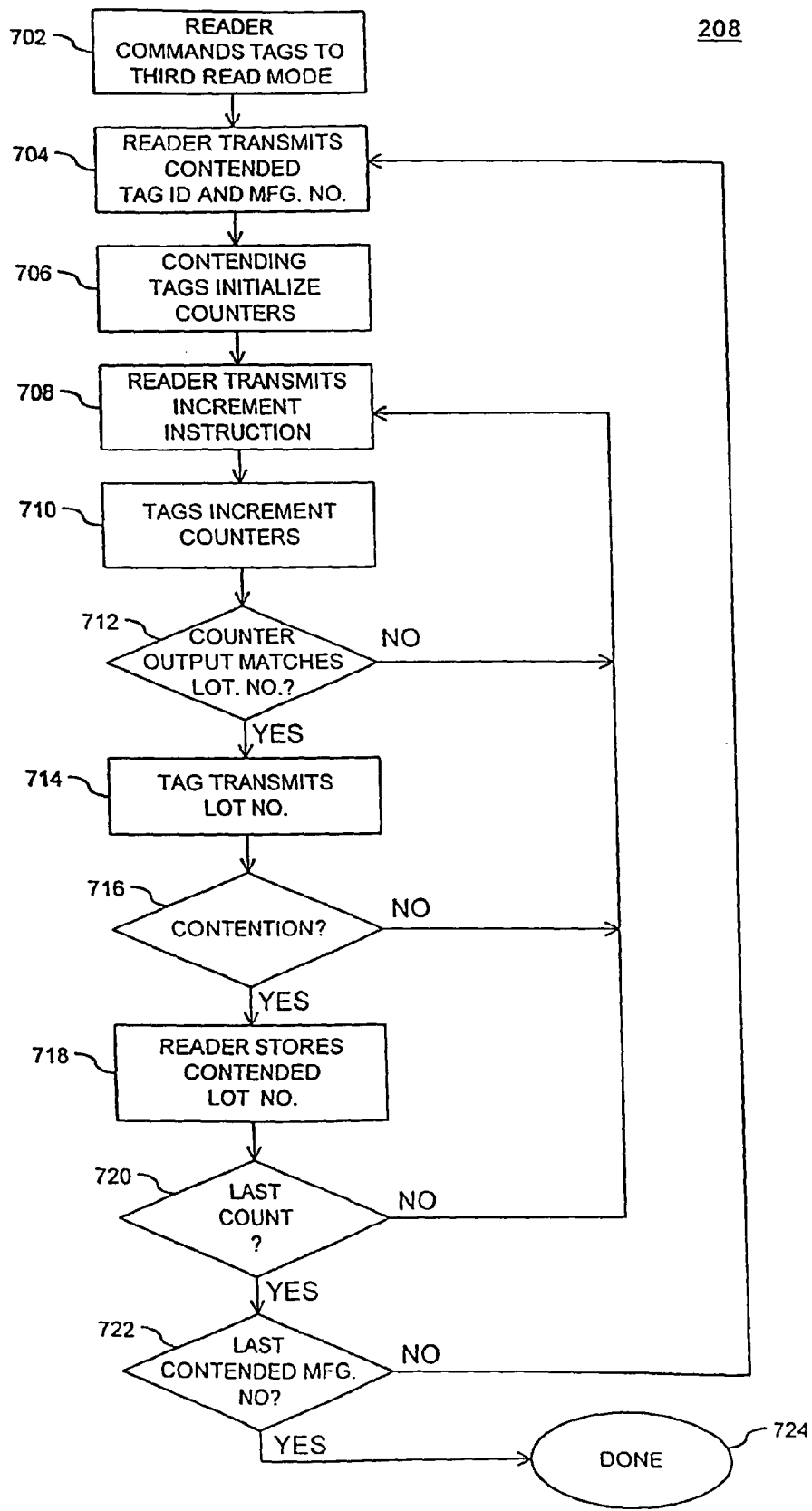
FIG. 7 is a flowchart depicting a third read operation of a timed broadcast read of the present invention.

In one embodiment, the present invention employs a third read cycle to resolve any time slot contentions that occurred during the second read cycle. FIG. 7 is a flowchart depicting the operation of the present invention in the third read cycle according to a preferred embodiment. During the third read cycle, the system examines contentions for each manufacturer number individually.

For each contended manufacturer number, tag reader 104 causes tags 102 to count in unison. When a tag's count matches its lot number, the tag transmits that lot number. In this way, the tag's lot number controls the time slot during which the tag transmits. Because it is highly unlikely that more than one tag will have the same Tag ID, manufacturer number, and lot number, it is extremely unlikely that two tags will transmit in the same time slot during the third read. Therefore, tag manufacturer number contention is resolved by the third read. In the unlikely event that multiple tags have the same Tag ID, manufacturer number, and lot number, contention can be resolved using a further read cycle based on other tag identification data, as would be apparent to one skilled in the relevant art using the above description.

Referring to FIG. 7, tag reader 104 initiates the third read cycle by sending a third read mode instruction to tags 102, as shown in a step 702. The reader then transmits a contended Tag ID and manufacturer number to the tags, as shown in a step 704. This step permits only those tags that contended for a particular Tag ID and manufacturer number to participate in contention resolution for that Tag ID and manufacturer number. In response to the transmission of the contended Tag ID and manufacturer number, only tags having that particular Tag ID and manufacturer number initialize their counters/shift registers 312, as shown in a step 706.

Tag reader 104 then transmits the first in a series of increment instructions, as shown in a step 708. In response, the contending tags increment their counter/shift registers 312, as shown in a step 710. When the output of a tag's counter/shift register 312 matches the tag lot number permanently programmed into lot number taps 314c, as indicated by the "yes" branch from step 712, the tag transmits its manufacturer number, as shown in a step 714.

In an alternative embodiment, the tag transmits a simple response signal as described above. Tag reader 104 then records the tag's lot number by storing the count in its counter/clock 406, as described above for the Tag ID.

If more than one tag transmits its lot number simultaneously, tag reader 104 detects the contention, as indicated by the "yes" branch from step 716, and tag reader 104 stores the contended manufacturer number for future contention resolution in a further read cycle, as shown in a step 718.

Tag reader 104 steps tags 102 through a predetermined range of possible lot numbers. When the last count is reached, as indicated by the "yes" branch from step 720, the process of steps 704 through 718 is repeated for the next contended manufacturer number. When the last contended manufacturer number has been examined, as indicated by the "yes" branch from step 722, the third read cycle is complete.

2.2 Immediate Read

Immediate read mode is used to read individual tags one at a time. In this mode, tag reader 104 transmits an instruction to a tag 102 that causes the tag to bypass the time slot counting operation and to immediately transmit its Tag ID number. This mode is useful for rapid Tag identification (on the order of milliseconds) when the individual tag rapidly passes through the reader zone. An example application is the reading of tags affixed to automobiles passing through an automatic toll booth.

2.3 Specific Tag Read

Specific tag read is used to determine whether one particular tag out is present in an ensemble of tags. Tag reader 104 accomplishes this by transmitting the particular Tag ID, manufacturer number, and lot number of the tag 102 that is sought. Because a complete set of Tag identification parameters is transmitted, only the tag being sought should respond. This approach is useful for retrieving a specific tagged item from an ensemble of items, for example for locating a particular inventory item in a warehouse or retail store.

3. Tag Manufacture

Figure 8:
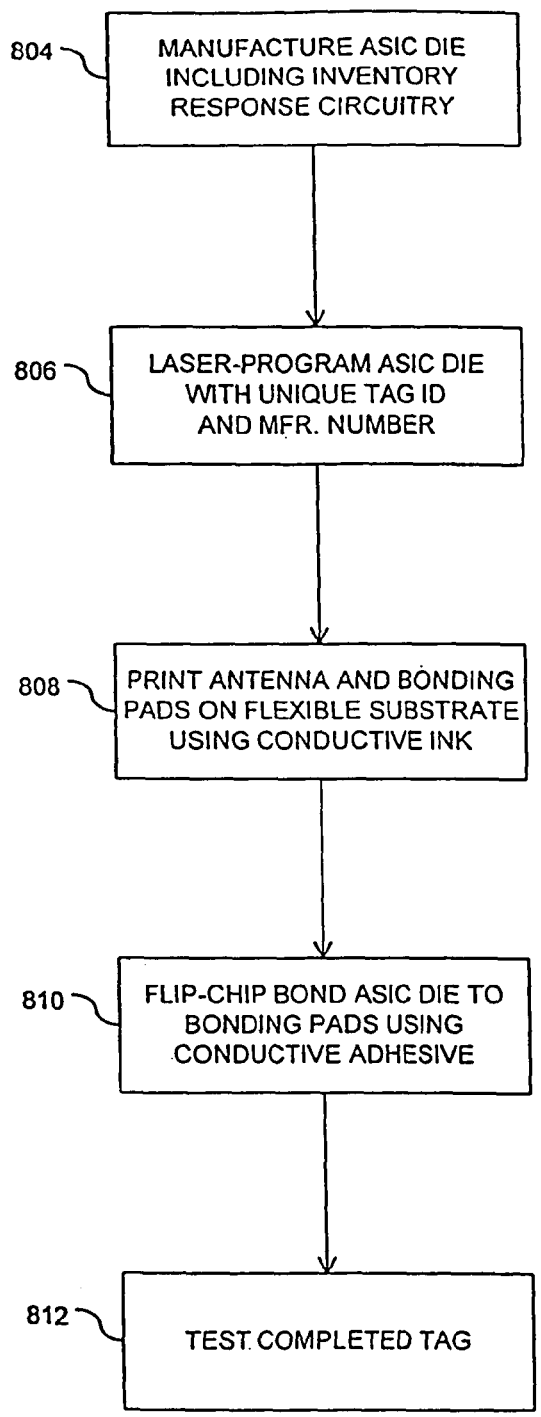
FIG. 8 is a flowchart depicting a method of manufacture for the RFID tag of the present invention.
Figure 9:
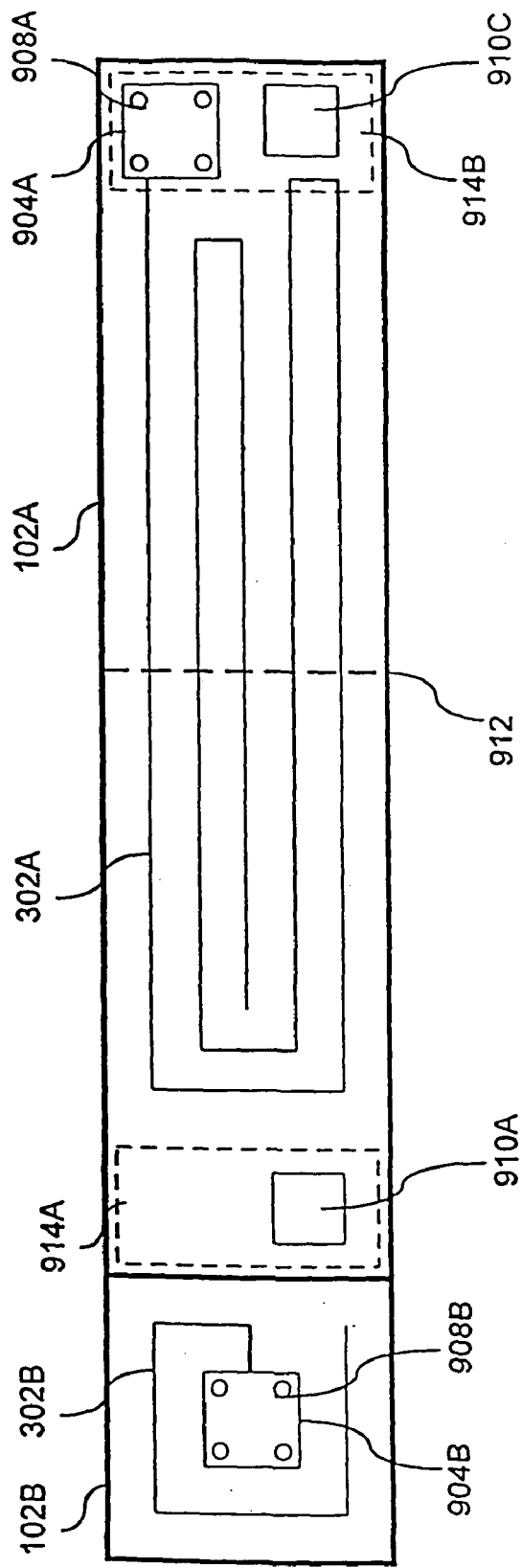
FIG. 9 depicts a pair of tags according to the present invention.

In order to be commercially viable, the RFID tags of the present invention must be inexpensive to manufacture. The present invention encompasses a unique method of manufacture to achieve this goal. FIG. 8 is a flowchart depicting a method of manufacture for the RFID tag 102 of the present invention. This method of manufacture is described with reference to the tag pair depicted in FIG. 9. FIG. 9 depicts a pair of tags 102a, 102b. Such a pair of tags is ideally suited for use in applications where two particular items need to be matched. In practice, tags 102a and 102b are separated by a person. Tag 102a is affixed to a first item, while tag 102b is affixed to a second item. In this way, the presence of both first and second items can be ensured. Each tag 102 includes an antenna 302 and an application-specific integrated circuit (ASIC) 904 mounted on bonding pads. Sensor 324 may be incorporated in ASIC 904. Alternatively, sensor 324 may be a separate component sharing the same substrate with other tag 102 components.

In one embodiment, tag 102a incorporates multiple tamper-resistant features. Tag 102a can be fixed to a first item by wrapping the tag about a portion of the item and joining tag portions 914a and 914b. In one embodiment, one area of 914 includes ASIC 904 so that attempting to separate areas 914a and 914b after joining destroys the ASIC and renders the tag inoperable. In another embodiment, tag 102a includes one or more perforated tear lines 912. Perforated tear lines 912 tear easily, so that any tampering with tag 102a causes the tag to separate at a tear line 912. This tearing provides an immediate visual indication of tampering. Tear lines 912 can be placed across critical portions of the tag circuitry, such as antenna 302a, such that tag separation along tear line 912 renders the tag inoperative.

As described above, tag 102 is powered by a power source, such as a battery, in one embodiment. In this embodiment, the battery may be formed by placing an anode 910a in one joining area 914a of the tag and placing a cathode 910c in the other joining area of the tag 914b. At least one of anode 910a and cathode 910c is coated with a electrolytic material and covered by a release liner. In another embodiment, tag 102 is powered by a capacitor. In that embodiment, at least one of anode 910a and cathode 910c is coated with a dielectric material and covered by a release liner. Other power sources may be used with tag 102 without departing from the spirit and scope of the present invention, as would be apparent to one skilled in the relevant art.

The two joining areas 914a,b of tag 102 are joined by removing the release liner and joining cathode 910c to anode 910a, thereby forming the power source of the tag. Any attempt to separate areas 914a,b after joining will destroy the power source formed by anode 910a and cathode 910c, thereby rendering the tag inoperative. In another embodiment, separating areas 914a,b after joining also gives a visual indication of tampering. For example, separating areas 914a,b could reveal a large "VOID" sign or some other image or break pattern.

Now the manufacture of tag 102 according to a preferred embodiment is described with reference to FIG. 8. In a step 804 one or more ASICs are manufactured. The ASICs include the inventory response circuitry depicted in FIG. 3. The circuitry includes the circuit elements of FIG. 3 except antenna 302. In one embodiment, all inventory response circuitry is contained upon a single ASIC. In another embodiment, RF circuitry is contained on one ASIC, and digital circuitry is contained on another ASIC. Then, in a step 806, the ASIC containing the digital inventory response circuitry is permanently programmed with at least the Tag ID and manufacturer number. In one embodiment the ASIC is also programmed with a lot number for the tag. In a preferred embodiment, these values are laser-programmed into taps 314a-314c, as described above.

Antenna 302 and bonding pads 908 are printed onto a flexible substrate using a conductive ink or material, as shown in a step 808. Such substrates are readily available from vendors such as 3M Corporation and Flexcon. Such conductive inks are widely available. Finally, the ASIC is flip-chip bonded to bonding pads 908 using a conductive adhesive, as shown in a step 810. One such conductive adhesive is a "z-axis" adhesive, which is well-known in the relevant art and is commercially available. The use of such an adhesive is advantageous in that adhesive conducts only in the z-axis. Therefore, even if the adhesive is applied so as to inadvertently join two bonding pads, the two pads do not short together. In one embodiment the ASIC is also hermetically sealed. In a preferred embodiment, ASIC 904 is manufactured using silicon-on-insulator technology.

As mentioned above, a key consideration in the manufacture of tags 102 is cost. A large component of the cost of manufacture of such items is the cost of testing the ASICs to ensure operability. In a preferred embodiment of the present invention, operability testing is deferred until tag manufacture is complete, as shown in a step 812. Also in the preferred embodiment, tags 102 are manufactured in bulk on a long continuous strip of substrate. The strips can be rolled for easy packaging, delivery, and dispensing. Before packaging, the strip is passed through a testing apparatus, where each tag in the strip is tested for operability. However, rather than attempting to discard inoperable tags, inoperable tags are merely marked as inoperable and are retained on the strip. Then, when a person encounters a tag marked inoperable in a roll of tags, the person merely discards the inoperative tag. This process saves considerable cost, and allows the tags of the present invention to be manufactured very inexpensively.

4. Electronic Article Surveillance Example

The present invention is ideally suited to use in electronic article surveillance. In a retail clothing store, for example, a tag can be attached to each article of clothing on display. One or more tag readers can then be used to maintain an inventory of the clothing articles. For example, a tag reader can be placed on each rack or display of clothing. Periodic reads of the rack or display can disclose exactly when an item is removed.

Tag readers placed at the exits to the store can prevent shoplifting. In this example, each item bears a tag. Because the tags are extremely small, they can be placed within an article so as to prevent removal or even discovery. For example, a tag could be placed within a label, button or seam of a garment, the plastic center of a compact disk, or the case of a videocassette, to facilitate both overt and covert operation.

The store maintains an inventory database of all the articles within the store. Each entry in the database represents a garment and contains the Tag ID of the tag embedded in the article. The entry also indicates whether the item has been purchased. When a tag of an unpurchased article is detected by a door reader, an alarm is sounded, indicating that the article is being shoplifted.

When an item is purchased, its tag ID is removed from the inventory database. Therefore, when a tag attached to a purchased article moves past the door reader, no alarm is sounded. Used alone or with security cameras, the present invention provides an effective tool to combat shoplifting.

In another embodiment, the present invention could be used to implement an "unattended store," i.e. one with no salespersons or clerks. A customer could enter the store, select items and go to a purchasing area. In the purchasing area, a tag reader would identify the customer's selections. The customer would then be presented with a bill. The customer could pay the bill with a credit card, whereupon the unattended store would remove the purchased item from its inventory database. The customer could then leave the store with the purchases. Alternatively, instead of presenting the customer with a bill, an account like a credit card account, store account, or debit account could be automatically charged, debited, or authenticated.

5. Example Instruction Set

Now an instruction set is described that can be used with the present invention. As would be apparent to one skilled in the relevant art, other instructions can be employed with the present invention without departing from its spirit and scope. In a preferred embodiment, the reader sends an instruction stream to the tag instruction register that is Nir bits long, where Nir is the number of stages in the instruction register. The instructions have the following data field format and symbolic binary values:

Np: Preamble: alerts the tags that the reader is starting communication. This data field is useful to prevent spurious noise from "spoofing" the tags and to initialize and synchronize the tag clock. The preamble starts with a long stream of "0" pulses from the reader, which starts the tag clock and initializes the tag instruction register. The 0's are followed by Np bits of a series of "1's", which alerts the tag that a reader instruction is following. Between instruction words, the reader sends out 0's for tag clock generation. When the preamble is present, the symbolic binary for this field is "1". A "0" represents the absence of the preamble.

Nw: Last instruction/in process/wake up: This data field is useful for dynamic read environments, where tags are moving into and out of the read zone, and prevents tags entering the read zone during a read cycle from erroneous communication. These tags will be "woken up" at the next read cycle to properly be identified. The "last instruction" sub-field notifies the tag to shut down. The symbolic binary form for this field is:

| | |
|---|---|
| First Instruction Alert: | 001 |
| Subsequent instructions after wake up: | 010 |
| Last instruction; shut down: | 100 |

Nt; Timed read cycle: Second read/first read: This field instructs the tag to go into the specified timed read cycle (first, second or third), with the following symbolic binary form:

| | |
|---|---|
| No timed read: | 000 |
| First read: | 001 |
| Second read: | 010 |
| Third read: | 100 |
| Specific read: | 111 |

Ni; Immediate read: When the symbolic binary form is "1", this field instructs the tag to immediately send out its ID number.

Nr; Specific tag read: When the symbolic binary form is "1", this field instructs the tag to go into the specific tag read mode as designated by Nt, above. The reader will cycle through three instructions to set the tag to the proper state. The first is with Nt=001 and sets the Tag ID counter for the targeted tag. The second is with Nt=010 and sets up the second counter with the targeted manufacturer number. The third is with Nt=100 and sets up the third counter with the targeted lot number. Then the reader sends out clock with Nt=111 to read only the targeted tag at every clock instruction.

Nm; Clock/Count: This field sets the counter shift registers (SR's) into either the clocked mode to increment the counter by the next clock signal, or into the SR mode, awaiting the following time slot, wafer/lot number, or date instruction stream. It has the symbolic binary form:

| | |
|---|---|
| Clocked mode: | 01 |
| Specific count: | 10 |

Ns; Clock signal/time slot. This data field contains either specific counter instruction data, or a stream of zeroes if the tag is being instructed into the count mode. The symbolic binary form is "1" when there is a specific counter instruction, and "0" for the count mode. When Nm=01 and Ns=0, a clock instruction counter, Nc, is enabled.

Nc: Clock instruction signal to increment counter/shift registers 312. The symbolic binary form is:

| | |
|---|---|
| No clock instruction: | 00 |
| Clock: | 01 |
| Last clock: | 11 |

The clock instruction counter, Nc, allows the reader to "short cycle" the tag through the count sequence, bypassing the Nir instruction sequence, which can be as long as 32, 48, or 64 bits. Nc, on the other hand, could theoretically be as short as 2 bits, although 4 bits is implemented here. Once the clock instruction is sent out, the reader waits for a tag response. If none comes within a specified time frame, it sends out another clock instruction. When a tag responds with its ID number, the reader waits until the ID number transmission is completed before sending out the next clock instruction. If only a few tens to a few hundreds of tags are in the ensemble, this "short cycle" clocking can accelerate tag read time by as much as a factor of 10. On completing the clock read cycle, the full instruction register will be re-enabled for the next sequence of instructions from the reader, such as for any required contention resolution, or for tag shut down.

When the reader is "short cycling" the tags by simply sending out clock instructions, spurious RF could cause a tag to lose its count. This will be detected by the reader when the tag responds with its full ID because the count will not match the received ID. If there is no contention when this occurs, the reader will successfully read this tag. If such contention occurs due to one or more tags losing their count, the reader could resolve this contention by sending out the time slot number and working backwards in time slots until this contention problem is resolved.

The n-bit instruction stream is organized as follows: Nir=Nc/Ns/Nm/Nr/Ni/Nt/Nw/Np, with each field comprised of sub-fields in the format described above. This provides the generalized symbolic binary form of Nir=xx/x/xx/x/x/xxx/xxx/x where the x's represent either 1's or 0's.

As described above, this instruction stream comprises 21 states. However, according to the present invention, other states can exist. As is apparent to persons skilled in the relevant arts, these 21 states can be described by 5 bits. The bits necessary to hold the contents of a specific read count preferably requires 12 bits. Therefore, according to this instruction set, a 17 bit instruction stream is required. However, an embodiment of the present invention comprises error correction coding that would increase the required size of the instruction stream.

Also, as described above, the instruction stream is interpreted by each tag's instruction interpreter 310. Instruction interpreter 310 can be implemented with a bit register. Using the 21 state example instruction set described above, a 17 bit register is required. However, instruction interpreter may employ other size bit registers. In addition, instruction interpreter 310 can be implemented with a comparator, software, a hardwired state machine, or any combination thereof.

An example instruction stream is shown below for each operational mode of the tag. The 1's represent a resulting action or state directed by an instruction sub-field while 0's represent the off state of an instruction sub-field.

|  | Nc/Ns/Nm/Nr/Ni/Nt/Nw/Np |
|---|---|
| Timed Broadcast Read: | |
| Initialization: | 00/0/00/0/0/000/000/0 |
| First instruction of first read cycle: | 00/0/01/0/0/001/001/1 |
| Following instructions of first read cycle: | 01/0/01/0/0/001/001/1 |
| Last clock instruction: | 11/0/01/0/0/001/010/1 |
| First instruction for second cycle: | 00/1/10/1/0/010/010/1 |
| Following instructions for second cycle: | 01/0/01/0/0/010/010/1 |
| Last clock instruction for second cycle: | 11/0/01/0/0/010/010/1 |
| First instruction for third cycle: | 00/1/10/1/0/100/010/1 |

|  | Nc/Ns/Nm/Nr/Ni/Nt/Nw/Np |
|---|---|
| Following instructions for third cycle: | 01/0/01/0/0/100/010/1 |
| Last clock instruction: | 11/0/01/0/0/100/010/1 |
| Last instruction (tags turn off): | 00/0/00/0/0/000/100/1 |
| Immediate Read: | |
| Initialization: | 00/0/00/0/0/000/000/0 |
| First instruction: | 00/0/00/0/1/000/001/1 |
| Next and last instruction (tag turns off): | 00/0/00/0/0/000/100/1 |
| Specific Tag Read: | |
| Initialization: | 00/0/00/0/0/000/000/0 |
| First instruction: | 00/1/10/1/0/001/001/1 |
| Second instruction: | 00/1/10/1/0/010/010/1 |
| Third instruction: | 00/1/10/1/0/100/010/1 |
| Following clock instructions: | 01/0/01/1/0/111/010/1 |
| Last clock instruction: | 11/0/01/0/0/111/010/1 |
| First instruction of next specific read: | 00/1/10/1/0/001/010/1 |
| Second instruction of next read: | 00/1/10/1/0/010/010/1 |
| Third instruction of next read: | 00/1/10/1/0/100/010/1 |
| Following clock instructions: | 01/0/01/1/0/111/010/1 |
| Last clock instruction: | 11/0/01/0/0/111/010/1 |
| Last instruction (tag turns off): | 00/0/00/0/0/000/100/1 |

6. Distributed Tag Reader Network

Figure 11:
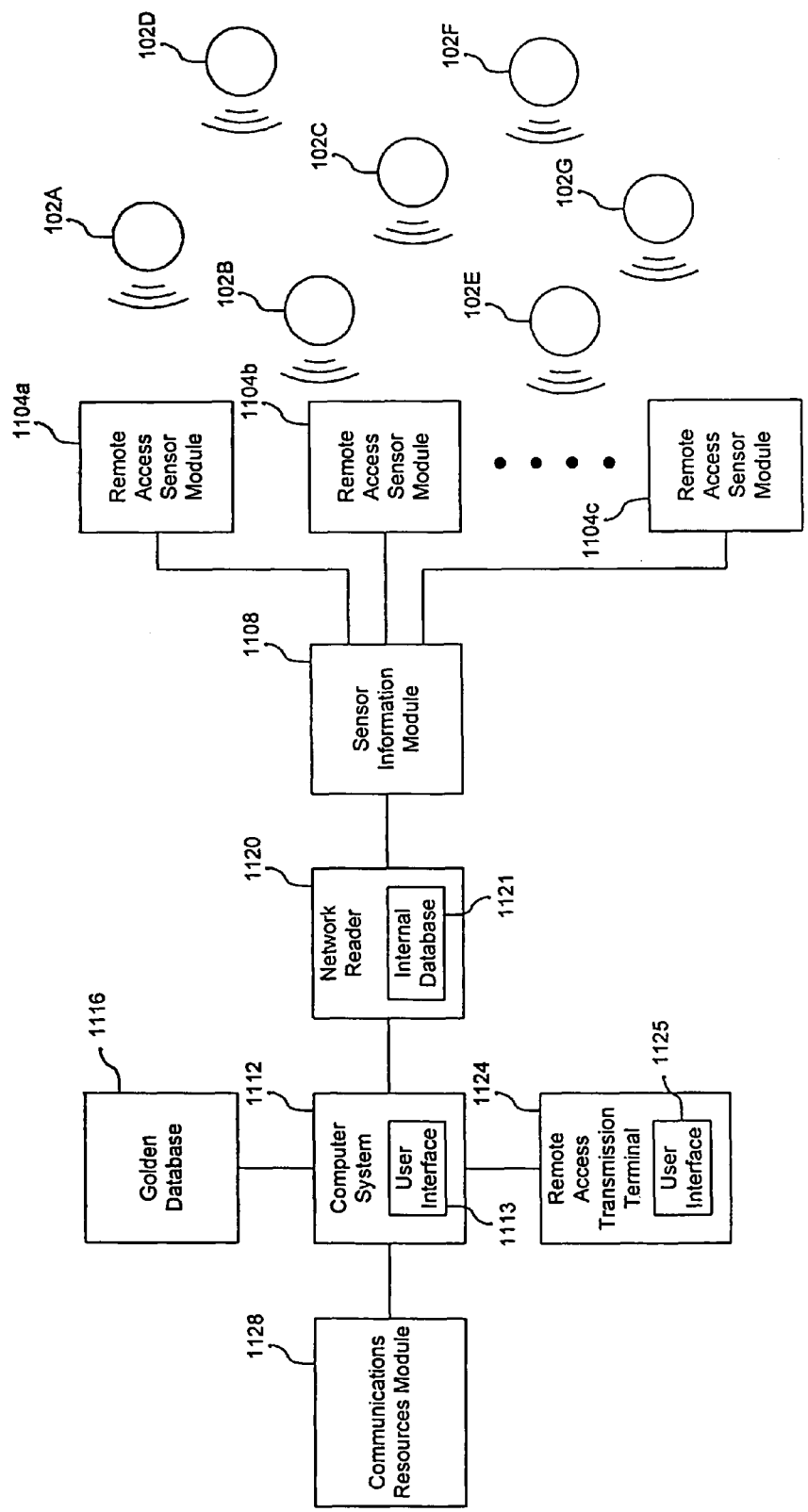
FIG. 11 is a block diagram of a distributed tag reader network system according to a preferred embodiment.

FIG. 11 illustrates a distributed tag reader network 1100 and a plurality of tags 102A-G according to a preferred embodiment of the present invention. Distributed tag reader network 1100 (also referred to as automated real-time distributed tag reader network 1100) comprises a plurality of remote access sensor modules 1104a-c, a sensor information module 1108, a computer system 1112, a golden database 1116, a network reader 1120, a remote access transmission terminal 1124, and a communications resources module 1128. Distributed tag reader network 1100 interrogates one or more tags 102 to perform automated real-time data applications. In a preferred embodiment, this interrogation is performed by computer system 1112 in conjunction with network reader 1120. The particular network of FIG. 11 is presented by way of example only. Other network topologies, architectures, and distributions of functionality can be employed, as would be apparent to a person skilled in the relevant arts.

Distributed tag reader network 1100 interacts with tags 102 to perform various data applications. These data applications include the applications described above as well as applications described below. Multiple remote access sensor modules 1104 enable distributed tag reader network 1100 to operate across multiple locations. These multiple locations may be physically isolated and/or overlapping. In addition, these multiple areas may be of varying size, shape, and dimension.

Figure 14:
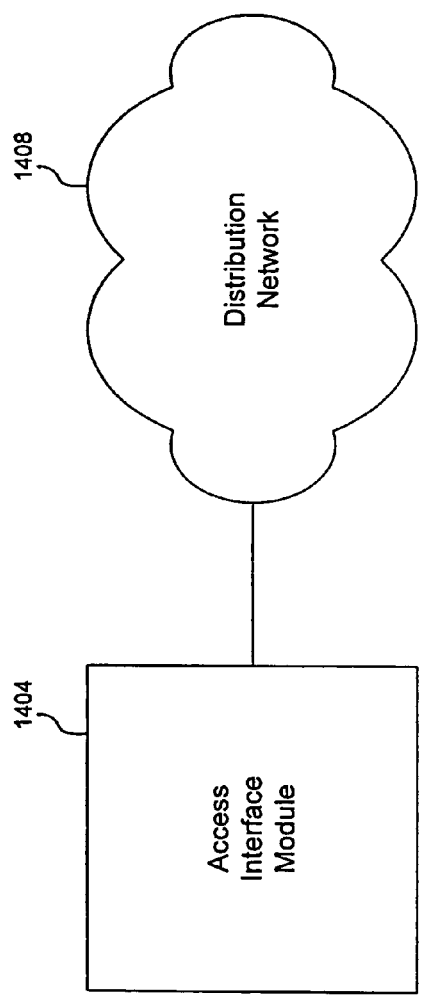
FIG. 14 illustrates a block diagram of a sensor information module according to a preferred embodiment.

Sensor information module 1108 facilitates the exchange of information between network reader 1120, remote access sensor modules 1104, and tags 102. FIG. 14 illustrates a block diagram of sensor information module 1108 according to a preferred embodiment. Sensor information module 1108 comprises an access interface module 1404 and a distribution network 1408. Access interface module 1404 provides a bidirectional communications interface for network reader 1120. In a preferred embodiment, this interface can be either wired or wireless. Examples of wired communications interfaces include local area network (LAN) interfaces, wide area network (WAN) interfaces, telephone network interfaces, fiber optic interfaces, as well as serial and parallel computer interfaces. These interfaces are well known to persons skilled in the relevant arts. Examples of wireless communications interfaces include wireless LAN interfaces, cellular telephone interfaces, optical interfaces such as infrared links, and any RF communications interface known to persons skilled in the relevant arts.

Access interface module 1404 is connected to distribution network 1408. Access interface module 1404 transmits information received from network reader 1120 across distribution network 1408 and receives information from remote access sensor modules 1104 and forwards this information to network reader 1120. In addition, access interface module 1404 converts between the communication formats and protocols of network reader 1120 and the communication formats and protocols of distribution network 1408, as would be apparent to a person skilled in the relevant arts.

Distribution network 1408 enables the bidirectional communication of data with a plurality of remote access sensor modules 1104. In a preferred embodiment, distribution network 1408 is an electrical power distribution system. Examples of electrical power distribution systems include electrical wiring in household, commercial, industrial, public, and municipal settings. Electrical power distribution systems also include high voltage transmission lines. In an alternate embodiment, distribution network 1408 is control wiring in a heating ventilation and air conditioning (HVAC) system. Control wiring in HVAC systems enable thermostats to convey signals to HVAC system components such as air conditioners, heat pumps, and furnaces. In addition to being an electrical power distribution system or control wiring in an HVAC system, distribution network 1408 can be any known communications network such as a LAN, a WAN, the internet, an intranet, a telecommunications network, a satellite link, or any combination thereof.

In a preferred embodiment, where distribution network 1408 is an electrical power distribution system, information exchange is performed across distribution network 1408 by digital modulation techniques that are well known to persons skilled in the relevant arts. To transmit information, the present invention modulates data signals and transmits the modulated data signals across distribution network 1408. Reception of the modulated data signals requires the filtering out of electrical power signals. Filtering out power signals is not difficult because, in the case of an electrical power distribution system, these signals are usually sinusoidal alternating current (AC) or straight direct current (DC) signals. Such signals have uncomplicated spectra and can be isolated with analog or digital filtering techniques well known to persons skilled in the relevant arts.

In a preferred embodiment, data signals transmitted across distribution network 1408 are modulated using either phase shift keying (PSK) or frequency shift keying (FSK) techniques at a data rate of 2400 bits per second (bps). However, any data rate may be used, as would be apparent to persons skilled in the relevant arts. The modulation of signals over electrical power distribution systems is well known to persons skilled in the relevant arts. For example, the Passport Plug-in Network™ product manufactured by Intelogis, Inc. enables computer network communications across household electrical wiring. In addition, error correction coding may be used for transmissions across sensor information module 1108 to minimize the bit error rate (BER), thereby significantly reducing the probability of erroneous system performance and the need for data retransmission. FSK modulation and error correction coding techniques are well known to persons skilled in the relevant arts. Moreover, the present invention may employ various modulation techniques at various data rates. Examples of other modulation techniques include binary phase shift keying (BPSK), and quadrature phase shift keying (QPSK).

Network reader 1120 (also referred to as network tag reader 1120) connects to computer system 1112 and to sensor information module 1108. In a preferred embodiment, network reader 1120 is a PCMCIA card that fits into a PCMCIA card slot on computer system 1112. However, network reader 1120 can be any type of smart card, hardware, firmware, software, or any combination thereof, as would be apparent to persons skilled in the relevant arts. Network reader 1120 includes and/or incorporates an internal database 1121. Internal database 1121 stores information related to tags 102 and updates this information as distributed tag reader network 1100 interacts with tags 102. In a preferred embodiment, internal database 1121 is implemented with flash memory. This implementation enables information stored in internal database 1121 to be protected during power outages.

Computer system 1112 connects to network reader 1120 and contains processing capability necessary to perform data applications involving the interrogation and/or inventory of tags 102. Furthermore, computer system 1112 is capable of controlling the performance of network reader 1120. Computer system 1112 also comprises a user interface 1113 that enables users to operate and maintain distributed tag reader network 1100. Examples of user interfaces 1113 include touch screens, keyboards, keypads, and displays. In a preferred embodiment, computer system 1112 is a notebook computer that connects to and houses network reader 1120 through a PCMCIA card slot. In alternate embodiments, computer system 1112 is a desktop computer, a workstation, a personal data assistant (PDA), dedicated hardware, firmware, software, or any combination thereof.

In an alternate embodiment, network reader 1120 fits into a portable device (not shown). An exemplary portable device is a PDA. In this embodiment, network reader 1120 can interact with sensor information module 1108, remote access sensor modules 1104, and tags 102 without a permanent connection to computer system 1112. In this embodiment, network reader 1120 and/or the attached portable device can be connected to computer system 1112 on a permanent or intermittent basis with any type of wired or wireless communications interface known to persons skilled in the relevant arts.

Network reader 1120 comprises the functional characteristics described above with reference to reader 104. Therefore, network reader 1120 comprises the full capability to communicate with tags 102. However, instead of communicating with tags 102 directly, network reader 1120 communicates with tags 102 via sensor information module 1108 and one or more remote access sensor modules 1104. Each remote access sensor module 1104 performs the RF transmission and reception functions of tag reader 104 described above with respect to modulator 408, demodulator 412, and antenna 410. In a preferred embodiment, the end-to-end communications between network reader 1120 and tags 102 are performed according to the timed broadcast read, immediate read, and specific read modes of operation described above. For the timed broadcast read mode, such communications include performing the steps described above with reference to FIGS. 2, 5, 6, and 7. Such communications also include operating according to the instruction set described above. In alternate embodiments, network reader 1120 can operate according to different modes, protocols, and schemes that are known to persons skilled in the relevant arts.

Information originating from network reader 1120 is transmitted to one or more tags 102 according to the techniques set forth above by two different approaches. The first approach involves network reader 1120 broadcasting information simultaneously to more than one remote access sensor module 1104. The second approach involves the point to point transmission of information from network reader 1120 to a specific remote access sensor module 1104.

Figure 12:
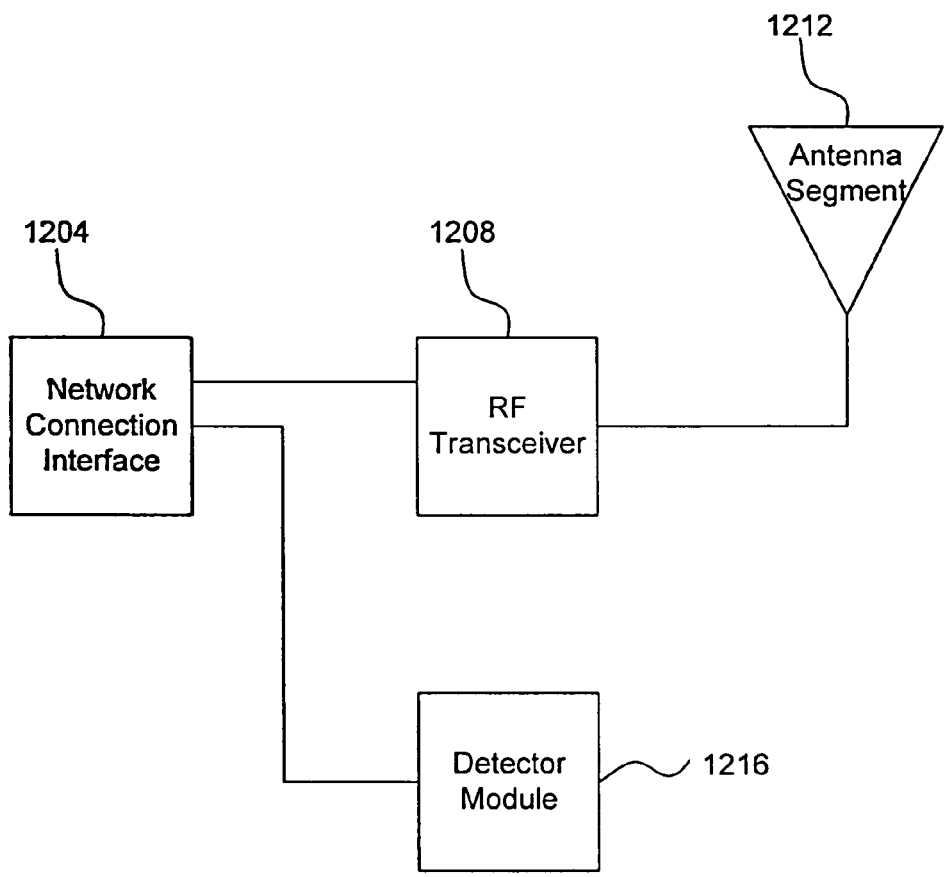
FIG. 12 is a block diagram of a remote access sensor module according to a preferred embodiment.

FIG. 12 illustrates a block diagram of remote access sensor module 1104 according to a preferred embodiment. Remote access sensor module 1104 comprises a network connection interface 1204, an RF transceiver 1208, an antenna segment 1212, and a detector module 1216. As stated above, remote access sensor module 1104 performs the RF transmission and reception functions of tag reader 104 described above with respect to modulator 408, demodulator 412, and antenna 410.

In a preferred embodiment, each remote access sensor module 1104 has an address. This address enables network reader 1120 to send instructions and information directly to a particular remote access sensor module 1104 or to a set of remote access sensor modules 1104. In addition, this address enables network reader 1120 to determine from which remote access sensor module 1104 it received information that was originated by a particular tag 102. In a preferred embodiment, all transmissions from remote access sensor modules 1104 that are directed to network reader 1120 contain a corresponding remote access sensor module 1104 address. Likewise, each transmission originating from network reader 1120 that is directed to one or more remote access sensor modules 1104 contains one or more corresponding remote access sensor module 1104 addresses. These addresses indicate which remote access sensor module(s) 1104 are to receive the transmission. The present invention may employ addressing schemes that are well known to persons skilled in the relevant arts. For example, the present invention may employ multicast addresses that specify more than one remote access sensor module 1104.

Network connection interface 1204 provides remote access sensor module 1104 with a connection to distribution network 1408 of sensor information module 1108. Network connection interface 1204 also establishes a connection to a power source that enables sustained operation of remote access sensor module 1104. In a preferred embodiment, where distribution network 1136 is an electrical power distribution system, the power source is the electrical power transmitted across distribution network 1408. Network connection interface 1204 transmits information received from RF transceiver 1208 across distribution network 1408 and receives information from distribution network 1408 and forwards this information to RF transceiver 1208. In addition, network connection interface 1204 converts between the communication formats and protocols of RF transceiver 1208 and the communication formats and protocols of distribution network 1408, as would be apparent to a person skilled in the relevant arts.

In a preferred embodiment, where distribution network 1408 is an electrical power distribution system, network connection interface 1204 demodulates information sent by network reader 1120 (which is transmitted across distribution network 1408 by access interface module 1404) into baseband signals, and converts the information in these signals into baseband signals formatted for transmission to tags 102. Network connection interface 1204 then forwards these signals to RF transceiver 1208. Network connection interface 1204 also converts baseband signals received from RF transceiver 1208 into a format for transmission across distribution network 1408. Network connection interface 1204 then modulates and transmits these modulated signals across distribution network 1408, where access interface module 1404 will receive these signals, and convert them for transmission to network reader 1120. As stated above, in a preferred embodiment, data signals transmitted across distribution network 1408 are modulated using either PSK or FSK at a data rate of 2400 symbols per second with error correction coding. However, other modulation techniques and data rates are well known to persons skilled in the relevant arts and can be used with the present invention.

As set forth above, in a preferred embodiment, each remote access sensor module 1104 has an address. This address is digitally encoded or stored in memory in network connection interface 1204 according to techniques well known to persons skilled in the relevant arts.

Within each remote access sensor module 1104, network connection interface 1204 is connected to RF transceiver 1208 and detector module 1216. The connection between network connection interface 1204 and RF transceiver 1208 handles bidirectional data communication. The connection between network connection interface 1204 and detector module 1216 enables information transfer from detector module 1216 to network connection interface 1204. However, this connection may also handle bidirectional data communication. As described above, network connection interface 1204 also establishes an interface between sensor information module 1108 and RF transceiver 1208. Network connection interface 1204 can be implemented with hardware, firmware, software, or any combination thereof.

RF transceiver 1208 is connected to network connection interface 1204 and antenna segment 1212. RF transceiver 1208 exchanges signals with tags 102 via antenna segment 1212. In a preferred embodiment, this exchange is by wireless communications in the same manner as described above with respect to communications between reader 104 and tags 102. Thus, these wireless communications involve the instructions and transmission formats described above. In addition, RF transceiver 1208 receives baseband signals from network connection interface 1204. These signals are modulated and amplified for wireless transmission to tags 102 via antenna segment 1212. Like tag reader 104, RF transceiver 1208 may vary the bit rate of its transmissions to tags 102. For example, RF transceiver 1208 may reduce the bit rate if it senses the existence of a noisy RF environment.

Furthermore, RF transceiver 1208 converts RF signals received from tags 102 via antenna segment 1212 into baseband signals and passes these signals to network connection interface 1204. In a preferred embodiment, RF transceiver 1208 comprises electronic circuitry implemented on a multi-layer printed circuit board (PCB).

Antenna segment 1212 transmits and receives signals. These signals are sent to and received from tags 102. In particular, antenna segment 1212 transmits signals that are received by the power converters 304 and the demodulators 306 of tags 102. In addition, antenna segment 1212 receives signals generated by modulators 320 of tags 102. In a preferred embodiment, antenna segment 1212 comprises one or more antennae disposed on an antenna substrate. The antenna substrate is preferably a thin, flexible, non-conductive polymer-based product. However, the antenna substrate may be composed of paper and/or other materials, as would be apparent to a person skilled in the relevant arts.

In antenna segment 1212, the one or more antennae are disposed on the antenna substrate by a metal deposition, oblation, or printing process. Vapor depositing is a well known example of a metal deposition process. Vapor depositing involves spraying a metallic vapor onto a substrate having a treated surface. The sprayed metallic vapor only adheres to the treated surface, thereby forming an antenna. Metal oblation processes involve removing metal from a substrate surface while leaving an antenna on the substrate surface. Ion bombardment and ion milling are well known examples of metal oblation processes.

In a preferred embodiment, each of these one or more antennae of antenna segment 1212 are enhanced by a transformer coil that is disposed on the antenna substrate. Each of these antennae are preferably a well known serpentine or helical dipole. However, these antennae may be other types, such as whip dipoles, or fractal antennas for energy harvesting. Such antennas are well known by persons skilled in the relevant arts.

Detector module 1216 detects events that are relevant to the effective and secure operation of distributed tag reader network 1100. Moreover, detector module 1216 enables distributed tag reader network 1100 to perform diagnostic analysis on each of its remote access sensor modules 1104. When such an event occurs, detector module 1216 generates an event report signal. This signal indicates the nature of the event and the particular remote access sensor module 1104 that contains detector module 1216. Event report signals are sent to network connection interface 1204 for transmission to network reader 1120. In a preferred embodiment, detector module 1216 is a sensor that triggers any physical displacement or strain that happens to remote access sensor module 1104. Events such as these may indicate whether a remote access sensor module 1104 is operable, or whether someone is tampering with a remote access sensor module 1104. Detector module 1216 can be implemented with strain gauges and/or accelerometers. These devices are well known to persons skilled in the relevant arts.

In a preferred embodiment, connection interface 1204, RF transceiver 1208, and detector module 1216 are electronic components placed on a printed circuit board, while antenna segment 1212 is disposed on an antenna substrate and connected to RF transceiver 1208 by one or more wires. However, in an alternate embodiment, connection interface 1204, RF transceiver 1208, antenna segment 1212, and detector module 1216 are all disposed on the antenna substrate.

RF transceiver 1208 and antenna segment 1212 define a coverage pattern for remote access sensor module 1104. The coverage pattern determines the area where tags 102 can be reached. The two main parameters that determine the characteristics of a coverage pattern are the transmit power of RF transceiver 1208 and the radiation pattern of antenna segment 1212. In a preferred embodiment of the present invention, these parameters may be modified to establish operating conditions that are optimal for the environment of distributed tag reader network 1100. In the present invention, each remote access sensor module 1104 of distributed tag reader network 1100 may have a distinct coverage pattern.

Figure 13:
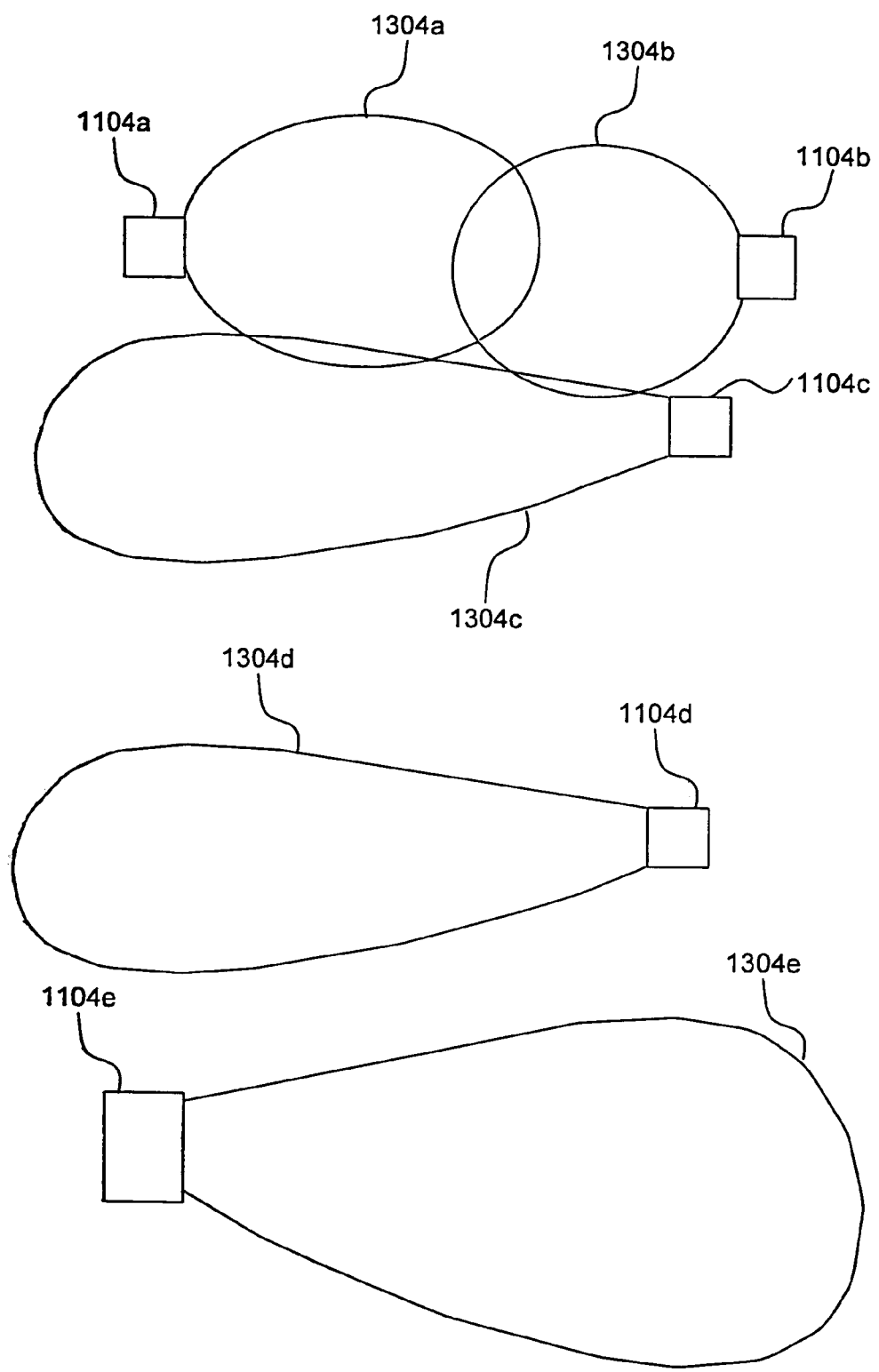
FIG. 13 illustrates an arrangement of remote access sensor modules and their respective coverage patterns.

FIG. 13 illustrates an arrangement of remote access sensor modules 1104 and their respective coverage patterns 1304. As illustrated, each coverage pattern 1304 can be of a distinct shape and size. For a particular remote access sensor module 1104, the shape and size of a coverage pattern 1304 is determined by the transmit power of RF transceiver 1208 and the gain pattern of antenna segment 1212. Furthermore, as illustrated, coverage patterns 1304 may or may not overlap. Whether two particular coverage patterns 1304 overlap depends on the physical separation of their corresponding remote access sensor modules 1104, as well as the shape, orientation, and size of each coverage pattern 1304.

As stated above, computer system 1112, in conjunction with network reader 1120, interrogates tags 102 to perform data applications. In a preferred embodiment, this interrogation is performed according to the techniques and modes of operation described above. Distributed tag reader network 1100 is also able to determine the specific locations of tags 102. This capability arises from the existence of distinct coverage patterns 1304 and an ability of network reader 1120 to interrogate tags 102 through individual remote access sensor modules 1104.

When network reader 1120 interrogates tags 102 through a particular remote access sensor module 1104, the results of this interrogation identify which tags 102 are within the coverage pattern 1304 of that particular remote access sensor module 1104. Thus, network reader 1120 can locate a specific tag 102 by conducting interrogations at each remote access sensor module 1104. In a preferred embodiment, network reader 1120 "polls" each remote access sensor module 1104 to maintain a record of the remote access sensor modules 1104 associated with each interrogated tag. In a further embodiment, network reader 1120 searches for one or more specific tags 102. To do this, network reader 1120 can "poll" each remote access sensor module 1104 until the desired tags 102 are located and associated with a particular remote access sensor module 1104. This searching is preferably performed through each remote access sensor module 1104 according to the specific tag read feature described above. However, this searching can be performed according to the other modes described above.

Alternatively, where overlapping coverage patterns 1304 exist, network reader 1120 can continue to poll each remote access sensor module 1104 to determine whether tags 102 exist in a specific area where two or more coverage patterns 1304 overlap. If network reader 1120 locates a tag 102 through more than one remote access sensor module 1104, then the located tag 102 exists in the area defined by the intersection of the overlapping coverage patterns 1304.

Golden database 1116 connects to computer system 1112. In a preferred embodiment, golden database 1116 stores and manages information that is related to data applications performed by distributed tag reader network 1100. This information relates to individual tags 102. This database is termed "golden" because it is entrusted with the valuable task of storing information related to tags 102 in a secure, long term manner.

In a preferred embodiment, golden database 1116 is implemented with a commercial database product and connects to computer system 1112 via middleware. Middleware comprises software that links together two different software applications. This concept is well known to persons skilled in the relevant arts. Middleware may be a software process running on computer system 1112 or on a different computer. In alternate embodiments, golden database 1116 is connected to computer system 1112 directly without middleware. The physical connections between golden database 1116, middleware, and computer system 1112 may be implemented with any type of communications network or peripheral interface. In a further embodiment of the present invention, golden database 1116 exists in computer system 1112.

Golden database 1116 may interact with other databases (not shown). For example, in inventory applications, golden database 1116 may interact with databases associated with preexisting legacy inventory systems, such as bar code oriented systems. This feature enables an electronic inventory approach in accordance with the present invention to be gradually phased in. For example, during the operation of distributed tag reader network 1100, information updates to golden database 1116 can be sent to an inventory database associated with a legacy system to maintain consistency between these databases during such a phasing in process.

Remote access transmission terminal 1124 is connected to computer system 1112. Remote access transmission terminal 1124 comprises a user interface 1125. In a preferred embodiment, user interface 1125 is a touch screen. However, in alternate embodiments, user interface 1125 can comprise other interfaces such as keypads, keyboards, displays, and various other user interfaces known to persons skilled in the relevant arts. Remote access transmission terminal 1124 enables persons to engage in transactions that involve the use of tags 102. For instance, remote access transmission terminal 1124 enables customers to purchase, rent, or borrow inventory items that are marked with tags 102. In addition, remote access transmission terminal 1124 can enable customers to confirm and authenticate transactions.

In a preferred embodiment, one or more remote access sensor modules 1104 interrogates tags 102 in the proximity of a person at remote access transmission terminal 1124. These remote access sensor modules 1104 have addresses that network reader 1120 recognizes as an address associated with remote access transmission terminal 1124. A person exchanges information with user interface 1125. This information pertains to transactions involving items that are associated with tags 102. Examples of items that are associated with tags 102 are retail inventory, rental items, library circulation materials, warehouse shipments, medical equipment in hospitals, and controlled items such as pharmaceuticals.

In an alternate embodiment, remote access transmission terminal 1124 is connected to sensor information module 1108 and further comprises an integral remote access sensor module 1104. In this embodiment, remote access transmission terminal 1124 interacts with computer system 1112 via sensor information module 1108 and network reader 1120.

Communications resources module 1128 connects to computer system 1112 and provides distributed tag reader network 1100 with access to other data networks. In addition, communications resources module 1128 can connect a plurality of individual distributed tag reader networks 1100 to enable these networks to collectively perform distributed data applications. Furthermore, communications resources module 1128 can connect to a reader service provider that monitors usage of distributed tag reader network 1100. Based on this usage, the reader service provider would charge the operators of distributed tag reader network 1100 according to a fee schedule. In a preferred embodiment, communications resources module 1128 is a modem connected to computer system 1112 by a peripheral interface that provides access to data networks such as the Internet. However, in alternate embodiments, communications resources module 1128 can be any type of interface that connects computer system 1112 to any type of data network. Examples of such interfaces include optical communications links, telecommunications lines, satellite links, LAN interfaces, and WAN interfaces.

In an alternate embodiment, distributed tag reader network 1100 may comprise additional modules that are not illustrated. Examples of these modules include a security module, a remote computer system, and disk storage. These modules are connected to computer system 1112.

Security module manages and monitors the security of distributed tag reader network 1100. In particular, security manager contains the processing capability necessary to monitor the operability of system components. For example, security module can initiate network reader 1120 via computer system 1112 to transmit diagnostic messages to each remote access sensor module 1104. In response to these messages, each operable remote access sensor module 1104 replies with a status message. This status message contains the address of the originating remote access sensor module 1104 and indicates that this remote access sensor module 1104 is operable. Network reader 1120 then forwards this information to security module via computer system 1112.

Security module also administers and distributes encryption data to components of distributed tag reader network 1100 to enable secure data applications such as automated transactions. This encryption data enables the elements of distributed tag reader network 1100 to communicate in a secure manner. Encryption techniques are well known to persons skilled in the relevant arts. Security module can securely connect to computer system 1112 by any type of communications network or peripheral interface. This secure connection is established through well known encryption techniques.

Remote computer system is a separate processing entity that executes software processes in coordination with software processes executed by computer system 1112. Together, these processes collaborate to perform data applications related to the interrogation of tags 102. Remote computer system may be one or more computers that are physically connected to computer system 1112 by any type of communications network or peripheral interface.

Disk storage provides computer system 1112 with the capability to store large quantities of data. In a preferred embodiment, disk storage is a file server connected to computer system 1112 by a LAN. However, disk storage may be any type of data storage capability that is connected to computer system 1112 by any type of communications network or peripheral interface.

6.1 Remote Access Sensor Module Implementations

FIGS. 16A-C and 17A-B illustrate implementations of remote access sensor modules 1104. These implementations are directed to embodiments of the present invention where distribution network is an electrical power distribution system.

Figure 16A:
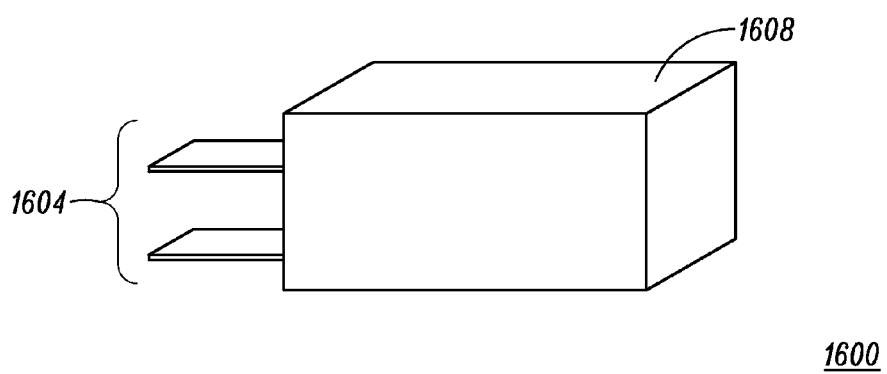
FIGS. 16A-C illustrate three implementations of a remote access sensor module according to a preferred embodiment.

FIG. 16A illustrates a first implementation 1600 of a remote access sensor module 1104 according to a preferred embodiment. First implementation 1600 comprises a prong connector 1604 and a first casing 1608. Network connection interface 1204 is connected to prong connector 1604. Prong connector 1604 connects to household electrical outlets, thereby establishing physical contact between sensor information module 1108 and network connection interface 1204. First casing 1608 houses the components of remote access sensor module 1104. As stated above, these components include network connection interface 1204, RF transceiver 1208, antenna segment 1212, and detector module 1216. In a preferred embodiment, first casing 1608 is fabricated from a material that does not shield RF communications between antenna segment 1212 and tags 102. Exemplary materials include dielectrics such as plastics. In an alternate embodiment, antenna segment 1212 is affixed to the outer surface of first casing 1608 by a metal deposition, oblation, or printing process. Such processes are well known to persons skilled in the relevant arts.

Figure 16B:
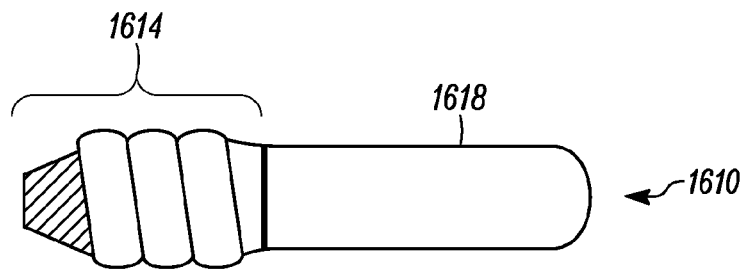

FIG. 16B illustrates a second implementation 1610 of remote access sensor module 1104 according to a further embodiment. Second implementation 1610 comprises an outlet connector 1614 and a second casing 1618. Network connection interface 1204 is connected to outlet connector 1614. Outlet connector 1614 is threaded and connects to incandescent electrical lighting fixtures (also known as light sockets), thereby establishing physical contact between sensor information module 1108 and network connection interface 1204. Alternatively, outlet connector 1614 can connect to fluorescent lighting fixtures, as well as other types of lighting fixtures. Like first casing 1608, second casing 1618 houses the components of remote access sensor module 1104. In a preferred embodiment, second casing 1618 is fabricated from a material that does not shield RF communications between antenna segment 1212 and tags 102. Examples of such materials include dielectrics such as plastics. In an alternate embodiment, antenna segment 1212 is affixed to the outer surface of second casing 1618 by a metal deposition, oblation, or printing process. Such processes are well known to persons skilled in the relevant arts.

Figure 16C:
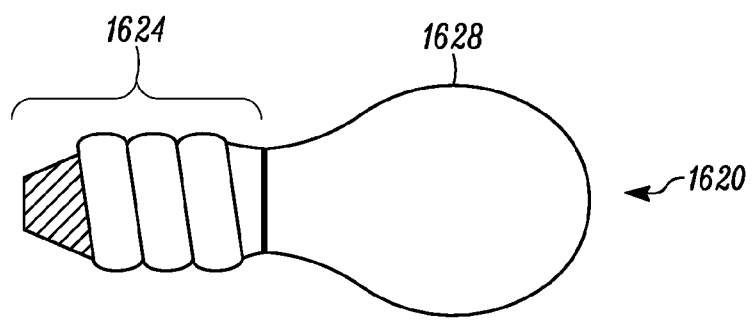

FIG. 16C illustrates a third implementation 1620 of remote access sensor module 1104 according to yet a further embodiment. Third implementation 1620 comprises an outlet connector 1624 and a bulb 1628. Network connection interface 1204 is connected to outlet connector 1624. Outlet connector 1624 is threaded and connects to electrical lighting fixtures (also known as light sockets), thereby establishing physical contact between sensor information module 1108 and network connection interface 1204. Bulb 1628 is an operable incandescent lightbulb. In a preferred embodiment, the components of remote access sensor module 1104 are housed inside bulb 1628. However, in an alternate embodiment, antenna segment 1212 is affixed to the outer surface of bulb 1628 by a metal deposition, oblation, or printing process. Such processes are well known to persons skilled in the relevant arts.

Alternatively, bulb 1628 can be any known lighting device, such as a fluorescent lighting tube, and outlet connector 1624 can connect to any known lighting fixture, such as a fluorescent lighting fixture.

Figure 17A:
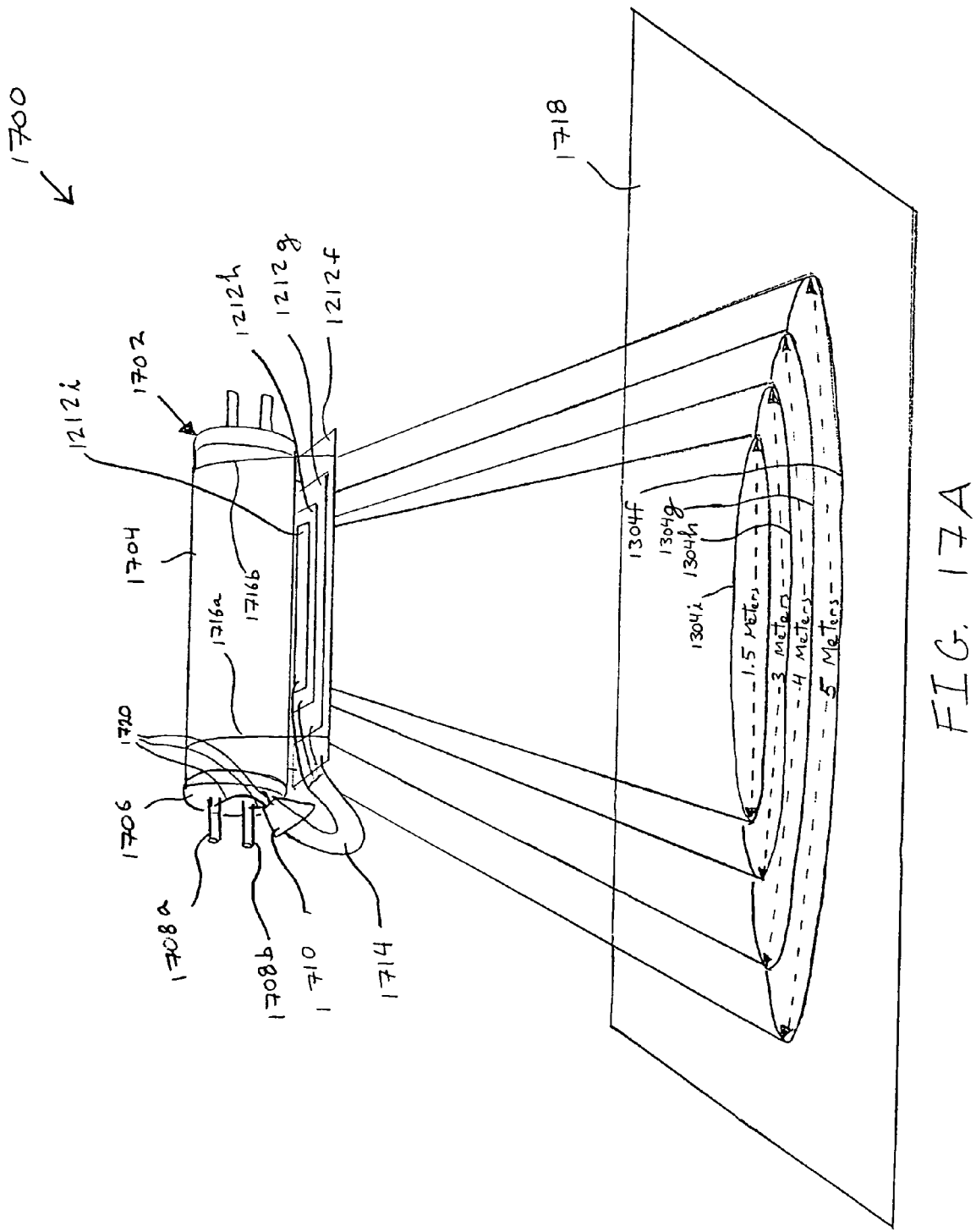
FIGS. 17A-B illustrate implementations of co-located remote access sensor modules.

According to the present invention, multiple remote access sensor modules 1104 can be placed in the same location. FIG. 17A illustrates a first implementation 1700 of four co-located remote access sensor modules 1104 (not shown in FIG. 17A). As shown in FIG. 17A, implementation 1700 is configured for the attachment of remote access sensor modules 1104 to a fluorescent light tube 1702. Fluorescent light tube 1702 is a standard lighting device, as would be apparent to person skilled in the relevant arts. Fluorescent light tube 1702 comprises a tube portion 1704, a nipple portion 1706, and first and second terminals 1708a and 1708b.

As described above, each remote access sensor module 1104 comprises a network connection interface 1204, an RF transceiver 1208, an antenna segment 1212, and a detector module 1216. For each of the remote access sensor modules 1104, the corresponding network connection interfaces 1204, RF transceivers 1208, and detector modules 1216 are contained in a housing 1710. The corresponding antenna segments 1212f-i are displaced outside of housing 1712 and connected to the corresponding RF transceivers 1208 by cabling 1714.

Antenna segments 1212f-i are suspended from fluorescent light tube 1702 by straps 1716a and 1716b. However, antenna segments 1212f-i may be suspended by other means, as would be apparent to a person skilled in the relevant arts. As described above, each antenna segment 1212 preferably comprises one or more antennae disposed on an antenna substrate by a metal deposition, oblation, or printing process. In a preferred embodiment, each of the antenna segments 1212f-i comprises a dipole antenna enhanced by a transformer coil on the antenna substrate. However, as set forth above, other antenna types may be employed.

For each of the co-located remote access sensor modules 1104, there are corresponding concentric overlapping coverage patterns 1304f-i. As shown in FIG. 17A, each of the coverage patterns 1304f-i are projected onto a surface 1718 such as a floor. Each of coverage patterns 1304f-i has a different size. For instance, coverage pattern 1304i is the smallest, while coverage pattern 1304f is the largest. In a preferred embodiment, the size of each of the coverage patterns 1304f-i is determined by the size of the dipole antennas disposed on the corresponding antenna segment 1212. In essence, the larger the dipole antenna is, the larger the coverage pattern becomes. However, in alternate embodiments, other techniques may be employed to change the coverage pattern size, as would be apparent to a person skilled in the relevant arts.

As described above, network connection interface 1204 provides the corresponding remote access sensor module 1104 with a connection to distribution network 1408 of sensor information module 1108. Network connection interface 1204 also establishes a connection to a power source that enables sustained operation of remote access sensor module 1104. In a preferred embodiment, implementation 1700 provides these connections to network connection interfaces 1204f-i with wires 1720 attached to terminals 1708a and 1708b, and nipple portion 1706.

While implementation 1700 illustrates four remote access sensor modules 1104, one or any number of co-located remote access sensor modules 1104 can be similarly implemented, as would be apparent to a person skilled in the relevant arts.

Figure 17B:
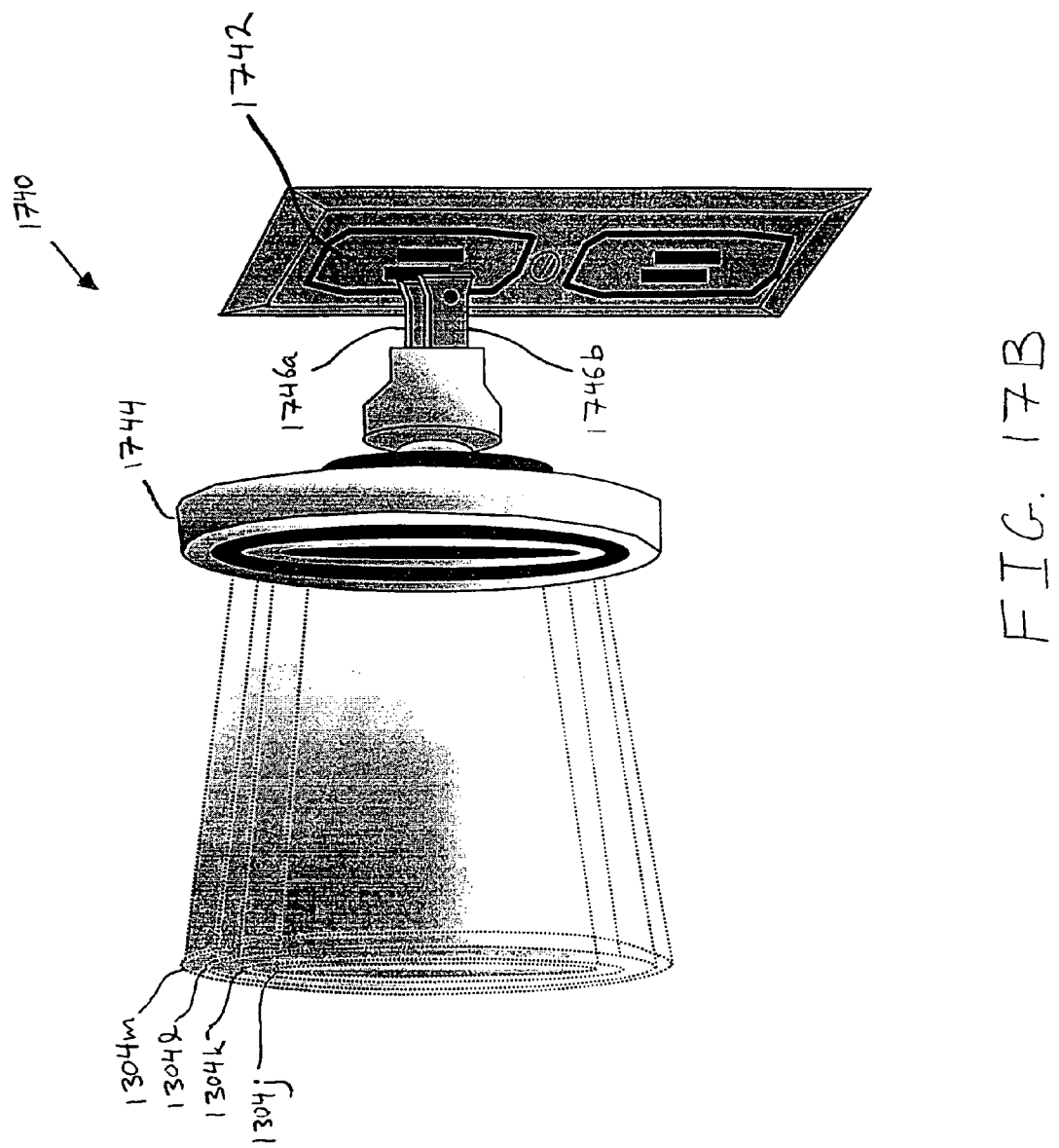

FIG. 17B illustrates a second implementation 1740 of four co-located remote access sensor modules 1104 (not shown in FIG. 17B). As shown in FIG. 17B, implementation 1740 is configured for the attachment of four remote access sensor modules 1104 to a conventional electrical socket 1742. Remote access sensor modules 1104 are housed in a casing 1744.

As described above, each antenna segment 1212 preferably comprises one or more antennae disposed on an antenna substrate by a metal deposition, oblation, or printing process. In a preferred embodiment, each of the antenna segments 1212 comprises a dipole antenna enhanced by a transformer coil on the corresponding antenna substrate. However, as set forth above, other antenna types may be employed. For each of the remote access sensor modules 1104, there are corresponding concentric overlapping coverage patterns 1304j-m. Each of coverage patterns 1304j-m has a different size. For instance, coverage pattern 1304j is the smallest, while coverage pattern 1304m is the largest. In a preferred embodiment, the size of each of the coverage patterns 1304j-m is determined by the size of the dipole antennas disposed on the corresponding antenna segment 1212. In essence, the larger the dipole antenna is, the larger the coverage pattern becomes. However, in alternate embodiments, other techniques may be employed to change the coverage pattern size, as would be apparent to a person skilled in the relevant arts.

As described above, network connection interface 1204 provides the corresponding remote access sensor module 1104 with a connection to distribution network 1408 of sensor information module 1108. Network connection interface 1204 also establishes a connection to a power source that enables sustained operation of remote access sensor module 1104. In a preferred embodiment, implementation 1740 provides these connections to network connection interfaces 1204j-m with prongs 1746a and 1746b attached to socket 1742.

While implementation 1740 illustrates four remote access sensor modules 1104, any number of co-located remote access sensor modules 1104 can be similarly implemented, as would be apparent to a person skilled in the relevant arts.

7. Distributed Tag Reader Network

Data Applications

As described above, distributed tag reader network 1100 can perform data applications. These data applications comprise inventory applications and automated transactions. Examples of inventory applications include location tracking and security monitoring. Automated transactions enable customers to purchase, rent, or borrow these items without the assistance of a clerk.

7.1 Inventory Applications

Figure 15:
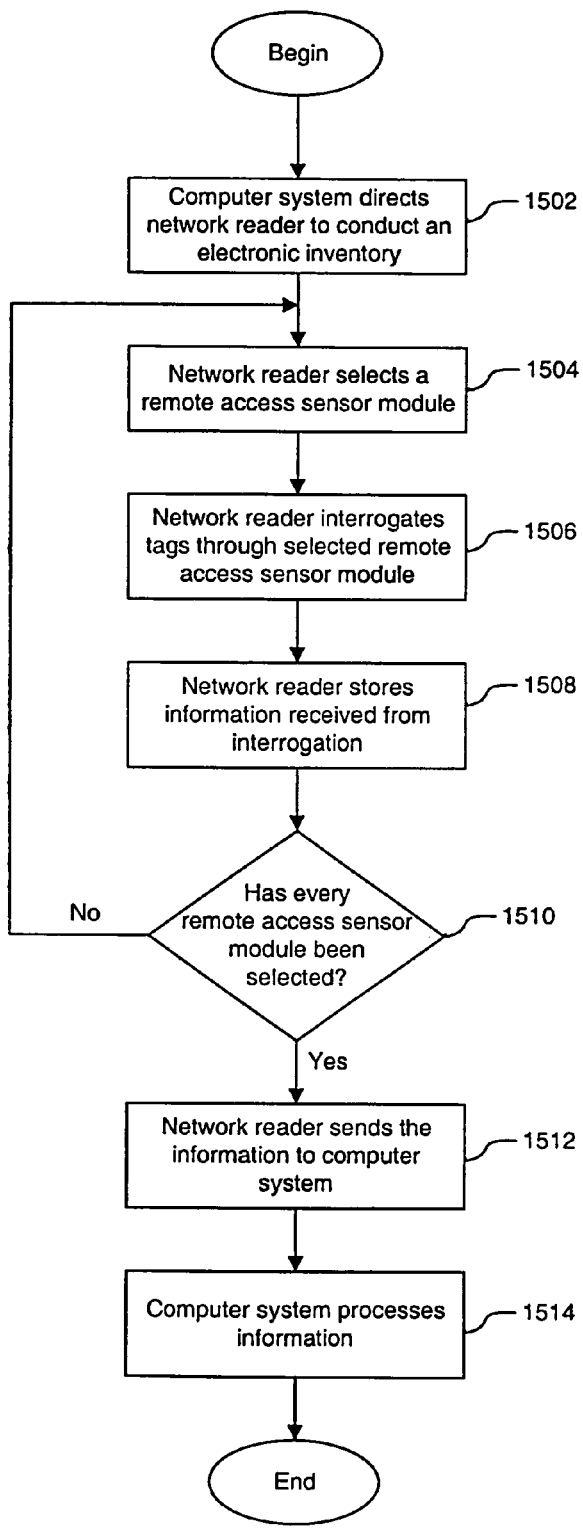
FIG. 15 is a flowchart illustrating the operation of an electronic inventory conducted by a distributed tag reader network according to a preferred embodiment.

FIG. 15 is a flowchart illustrating the operation of an electronic inventory conducted by distributed tag reader network 1100 according to a preferred embodiment of the present invention. This electronic inventory can be used to determine the location of objects attached to tags 102. The operation of this inventory commences with step 1502. In step 1502, computer system 1112 directs network reader 1120 to conduct an electronic inventory through one or more remote access sensor modules 1104.

Next, in step 1504, network reader 1120 selects a remote access sensor module 1104. This step comprises selecting a remote access sensor module 1104 according to either a predetermined means such as by its address, by a random process, or through an adaptive process based on the location and activity of tags 102 that have been interacting with distributed tag reader network 1100.

In step 1506, network reader 1120 interrogates tags 102 through the remote access sensor module 1104 selected in step 1504. In performing this step, network reader 1120 receives information regarding one or more tags that are within the physical area defined by the coverage pattern of the selected remote access sensor module.

In a preferred embodiment, step 1506 is performed according to the timed broadcast read mode. Therefore, step 1506 comprises the steps described above with reference to FIGS. 2, 5, 6, and 7. However, instead of reader 104 communicating with tags 102 directly, the steps in FIGS. 2, 5, 6, and 7 are performed by network reader 1120 communicating with tags 102 through the remote access sensor module 1104 selected in step 1504. Step 1506 also includes operating according to the instruction set described above. In alternate embodiments, step 1506 can be performed according to different modes, protocols, and schemes that are described above or known to persons skilled in the relevant arts.

As stated above, during step 1506, network reader 1120 receives information regarding one or more tags that are within the physical area defined by the coverage pattern of the selected remote access sensor module. In a preferred embodiment, this information comprises one or more tag IDs, wherein each of these tag IDs corresponds to a tag 102 within the physical area defined by the coverage pattern 1304 of the remote access sensor module 1104 selected in step 1504. When performed according to the timed broadcast mode, this information may also potentially comprise one or more manufacturer numbers and one or more lot numbers pursuant to the performance of the second and third read cycles, as described above with reference to FIGS. 2, 5, 6, and 7. In addition, further numbers may be potentially received according to additional read cycles. Alternatively, the information received in step 1506 may comprise simple response signals as described above.

During step 1506, network reader 1120 may also receive sensor information originated by one or more sensors 324 in tags 102 that are within the physical area defined by the coverage pattern 1304 of the remote access sensor module 1104 selected in step 1504. As described above, data collected by sensors 324 is routed to counter/shift register 312 each time tag 102 transmits. The sensor data is appended to the tag transmission.

In step 1508, network reader 1120 stores information received from the interrogation conducted in step 1506. In a preferred embodiment, this step comprises arranging and storing this information in a plurality of inventory records in internal database 1121. Inventory records are described below with reference to FIGS. 10A-C. The information processed in this step comprises tag IDs, the identity of the remote access sensor module 1104 that accessed the tag ID, and any sensor information originated by sensors in each tag 102.

In step 1510, network reader 1120 determines whether every remote access sensor module 1104 has been selected. If every remote access sensor module 1104 has not been selected, steps 1504 through 1508 are performed. Otherwise, step 1512 is performed. In step 1512, network reader 1120 sends the information it received and processed to computer system 1112. Alternatively, in step 1510, network reader 1120 determines whether one or more particular remote access sensor modules 1104 have been selected. If these one or more particular remote access sensor modules have been selected, then step 1512 is performed.

In step 1512, network reader 1120 sends information stored in internal database 1121 to computer system 1112. Alternatively, in step 1512, computer system 1112 accesses information stored in internal database 1121.

Next in step 1514, computer system 1112 processes this information. Computer system 1112 processes this information in accordance with a data application, such as the location tracking and security monitoring applications described below. However, this step may comprise processing in accordance with other data applications, as would be apparent to a person skilled in the relevant arts.

7.1.1 Location Tracking

Distributed tag reader network 1100 can track the location of individuals and items connected to tags 102 as they move through regions defined by coverage patterns 1304. Examples of such data applications include the tracking of retail inventory in a store, the tracking of equipment and/or inventory in a large facility, the tracking of pets, and the tracking of children in large areas such as amusement parks. A further example of such a data application includes monitoring the movements of persons carrying a tag 102 in their homes for home healthcare monitoring. Such home healthcare monitoring would enable the detection of either excessive movement or a lack of movement. Such detection could indicate a health emergency, and could shorten response times for medical treatment.

In these examples, one or more distributed tag reader networks 1100 are set up with remote access sensor modules 1104 throughout an area. Since electrical power distribution systems are prevalent, a collection of remote access sensor modules 1104 could be easily placed throughout an area by using the implementations of remote access sensor modules as described with reference to FIGS. 16A-C, and 17A-B. This collection of sensors would define a set of coverage patterns 1304 that would indicate a set of regions in the area.

Computer system 1112 would control the performance of the steps illustrated in FIG. 15 to monitor the location of each person or item that has a tag 102. Thus, in a location tracking application, step 1514 comprises for each of the inventory records stored in step 1508, correlating remote access sensor module 1104 identities with Tag IDs received in step 1506 to maintain current and accurate data regarding the location of each tag 102 corresponding to the Tag IDs received in step 1506, as indicated by the coverage patterns 1304 where each tag 102 is located.

In a preferred embodiment, steps 1502-1514 would be repeatedly performed to maintain the current locations of each tag 102. These steps are preferably repeated at programmable time intervals, where computer system 1112 waits for the programmable time interval to elapse before reinitiating steps 1502 through 1514. In an alternate embodiment, steps 1502 through 1514 could be performed at times associated with certain events. For example, an electronic inventory can be performed to detect whether an automobile having a tag 102 affixed to it is in a street intersection after the intersection's traffic light becomes red. In this embodiment, the tag 102 is affixed to the automobile's license plate and uniquely identifies the automobile. Also, remote access sensor modules 1104 are placed and adapted so that their corresponding coverage patterns 1304 cover a detection area where traffic violations are to be detected. For example, remote access sensor modules 1104 could be implemented in traffic signal light bulbs and/or street lights. The antenna segments 1212 and RF transceivers 1208 in these remote access sensor modules 1104 can be designed according to well known techniques to provide coverage patterns 1304 that define a detection area. According to the present invention, a detection area may comprise any combination of coverage patterns 1304 and/or any combination of areas where coverage patterns 1304 overlap. In this embodiment, step 1514 comprises determining whether a tag ID is associated with the remote access sensor modules 1104 that define the detection area.

In a further embodiment of the present invention, distributed tag reader system 1100 can track the location of stolen cars. In this embodiment, remote access sensor modules 1104 are placed along streets, roads, and highways. When a car having a tag 102 is stolen, an electronic inventory as described with reference to FIG. 15 will reveal the location of the stolen car if it is within a coverage pattern 1304 corresponding to a remote access sensor module 1104. In this application, step 1514 comprises the steps of searching for inventory records containing a tag ID that corresponds to a stolen car and determining its location based on the remote access sensor module(s) 1104 associated with the stolen car's tag ID.

7.1.2 Security Monitoring

Security monitoring is another example of an inventory application. Security monitoring applications involve analyzing information transmitted from one or more sensors 324 in tags 102 during the performance of step 1506. As described above, examples of such information include temperature and vibration information. In accordance with this application, tags 102 could be discretely placed in an area for monitoring by distributed tag reader network 1100. For example, tags 102 can be placed in locations such as windows, doors, and walls. In addition, tags 102 can be embedded in wallpaper.

In a preferred embodiment, steps 1502-1514 would be repeatedly performed to achieve continuous security monitoring. These steps are preferably repeated at programmable time intervals, where computer system 1112 waits for the programmable time interval to elapse before reinitiating steps 1502 through 1514.

Accordingly, security monitoring applications involve analyzing the information output by tags 102 pursuant to step 1506 and stored in inventory records pursuant to step 1508. Thus, according to the present invention, step 1514 comprises the step of analyzing sensor information associated with each tag ID for conditions that indicate a security breach. Examples of such conditions include a fluctuation in temperature and/or a sudden vibration. Computer system 1112 can analyze this sensor information by comparing changes in sensor information over time, as steps 1502-1514 are repeatedly performed.

If such conditions exist, step 1514 comprises initiating a security action. As described below with reference to FIG. 10C, examples of security actions include turning on a surveillance camera, locking turnstiles, gates, and/or doors that control egress from areas, activating a silent alarm, sending a silent page to personnel, activating an audible alarm, and taking no action. In a preferred embodiment, a database record in either golden database 1116 and/or internal database 1121 can specify one or more specific security actions for a particular Tag ID and a particular condition.

7.1.3 Exemplary Database

As described above with reference to FIG. 11, network reader 1120 comprises an internal database 1121. Internal database 1121 stores information related to tags 102 and updates this information as distributed tag reader network 1100 interacts with tags 102. In a preferred embodiment, for each tag ID, this information comprises one or more static records and one or more dynamic records. These records are referred to herein as inventory records. In a preferred embodiment, step 1508, as shown in FIG. 15, comprises the step of updating dynamic records.

FIG. 10A illustrates an exemplary set of static records 1040. Static records 1040 contain information that pertains to a particular tag ID 1042. This information does not generally change over time. As illustrated in FIG. 10A, for tag ID 1042, there is a corresponding existing barcode record 1040a and a corresponding item description record 1040b. The set of static records 1040 is dependent on the data application, and any information can be stored in static records 1040. Therefore, other static records 1040 may exist for each tag ID, as would be apparent to a person skilled in the relevant arts.

Existing barcode record 1040a represents information contained on a bar code label affixed to an item that is attached to a tag 102 having the corresponding tag ID. Often, conventional bar codes, such as Universal Product Codes (UPC), indicate a generic item type. For example, a bar code may identify a particular type or model of a retail product. However, a tag 102 affixed to a particular item uniquely identifies the item by its tag ID. Therefore, the present invention goes beyond conventional bar codes by enabling the tracking, monitoring, and control of particular items. Existing barcode record 1040a can be set by reading the barcode label with a barcode reader while reading tag ID 1042 with either reader 104 or network reader 1120.

Item description record 1040b provides descriptive information pertaining to an item attached to a tag 102 that corresponds to tag ID 1042. As illustrated in FIG. 10A, item description record 1040b describes the identity of a movie in a video rental store. However, item description record 1040b can include any type of information that describes an item of inventory.

FIG. 10B illustrates an exemplary set of dynamic records 1080. Dynamic records 1080 contain information that is updated as distributed tag reader network 1100 interacts with tags 102. As illustrated in FIG. 10B, for tag ID 1082, there is a corresponding location record 1080a, a corresponding dynamic security action record 1080b, and a corresponding customer record 1080c. The set of dynamic records 1080 is dependent on the data application, and any information can be stored in dynamic records 1080. Therefore, other dynamic records 1080 may exist for each tag ID, as would be apparent to a person skilled in the relevant arts.

Location record 1080*a* contains information that identifies the location of the tag 102 having tag ID 1082. In essence, location record 1080*a* identifies the particular remote access sensor module 1104 that received a transmission containing tag ID 1082 during step 1506 of FIG. 15.

Customer record 1080*c* is used in applications involving transactions where persons obtain possession of items attached to tags 102. In such applications, customer record 1080*c* indicates the identity of the person who has possession of the item attached to the tag 102 having tag ID 1082.

Dynamic security action record 1580*b* identifies whether the presence of tag ID 1082, which was received during an initial performance of step 1506 of FIG. 15, has been received during a subsequent performance of step 1506 within a predetermined time period. If tag ID 1082 has been received during a subsequent performance of step 1506 within a predetermined time period, network reader 1120 stores information in dynamic security action record 1080*b* that indicates tag ID 1082 is "accounted". However, if tag ID 1082 has not been subsequently detected within a predetermined time period, network reader 1120 stores in dynamic security action record 1080*b* information that indicates tag ID 1082 is missing in action or "MIA". Tag ID 1082 can become missing if the corresponding tag 102 is moved to an area not covered by a coverage pattern 1304. In addition, tag ID 1082 can become missing in action if the corresponding tag 102 is placed in a container that shields RF transmissions. A metallic box is an example of such a container. However, other containers can shield RF transmissions, as would be apparent to a person skilled in the relevant arts.

In addition, dynamic security action record 1580*b* can indicate whether a tag ID is detected outside of one or more valid coverage patterns 1304. For example, if during the performance of step 1506, a tag ID 1082 has been received that is not authorized to be in the coverage pattern 1304 corresponding to the selected remote access sensor module 1104, then dynamic security action record 1580*b* will indicate an unauthorized location. Internal database 1121 may comprise a static record that indicates authorized coverage patterns 1304 for each tag ID. Such authorized coverage patterns may be established in retail stores to prevent inventory from leaving certain areas.

If a tag ID becomes missing in action or in an unauthorized location, different security actions can be taken. For instance, under the command of computer system 1112, a surveillance camera connected to computer system 1112 can be turned on, turnstiles, gates, and/or doors connected to computer system 1112 that control egress from areas can be locked, a silent alarm can be activated through communications resources module 1128, personnel can receive a silent page through communications resources module 1128, an audible alarm can be activated, or any combination of these actions can be taken. In addition, no action can be taken if a tag ID becomes missing in action or in an unauthorized location.

Figure 10C:
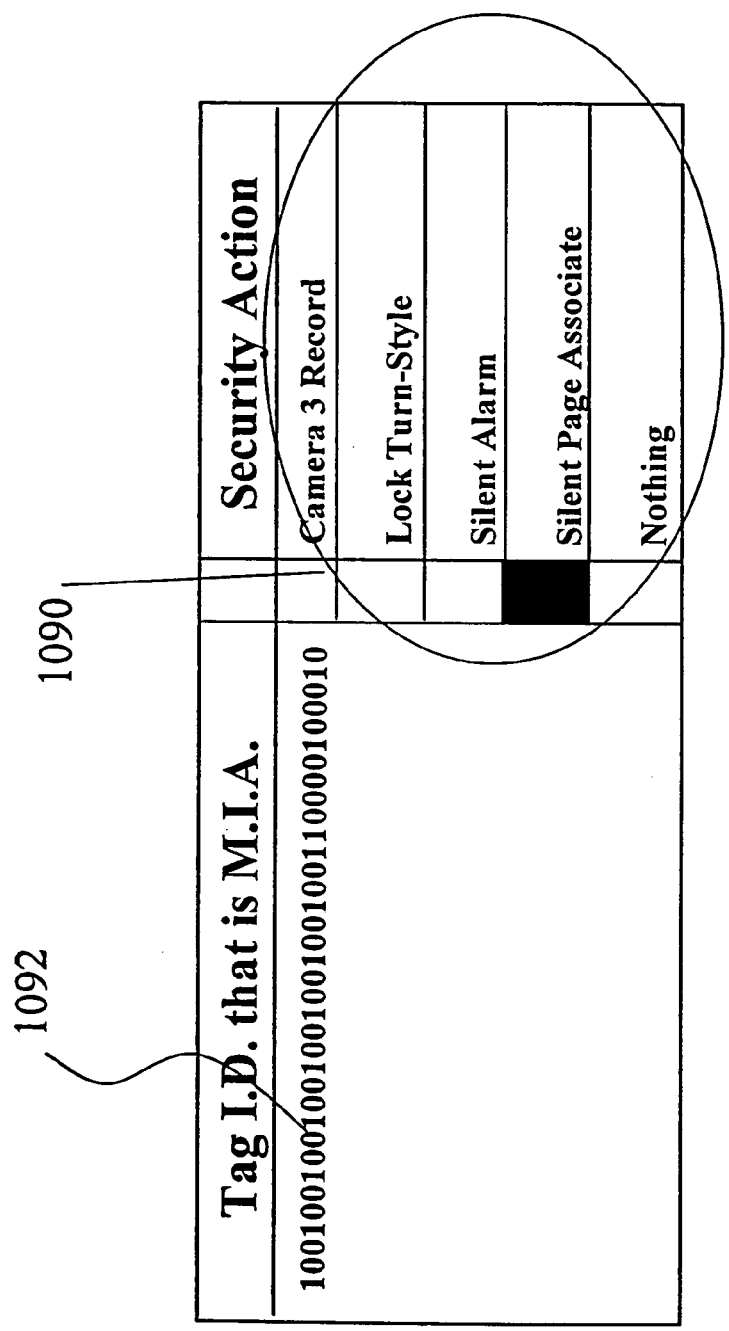

In a preferred embodiment, internal database 1121 comprises a static security action field that indicates one or more security measures that are appropriate for each tag ID. FIG. 10C illustrates an exemplary static security action field 1090 for tag ID 1092. In a preferred embodiment, step 1514 of FIG. 15 comprises the step of initiating one or more security actions indicated by a static security action field in internal database 1121 when a tag ID's dynamic security action record indicates that the tag ID is "MIA", or in an unauthorized location.

Other dynamic records may exist for each tag ID. For instance, a dynamic field can indicate the identity of a person who possesses the inventory associated with tag ID 1082, and information received from a sensor in a tag 102.

The exemplary database records described with reference to FIGS. 10A-C apply not only to the inventory applications described above, but also to the automated transaction applications described below, and any other applications. These records may be stored in golden database 1116 and/or internal database 1121.

7.2 Automated Transactions

As stated above, distributed tag reader network 1100 can perform data applications such as automated transactions. Automated transactions involve affixing tags 102 to inventory items and enabling customers to purchase, rent, or borrow these items without the assistance of a clerk. These tags 102 identify each inventory item. Moreover, in a preferred embodiment, each customer carries an identification card. This identification card includes a tag 102 containing a tag ID that uniquely identifies the customer. This tag ID is also referred to as a customer ID. Automated transactions involve the interrogation of these tags 102. Remote access sensor modules 1104 have corresponding coverage areas 1304 that cover one or more designated transaction locations. A remote access transmission terminal 1124 is also in each designated transaction location.

Automated transactions can involve the use of security features to prevent the unauthorized access of items from an area. For example, automated gates and/or turnstiles may be placed near an area's exits. These gates are connected to computer system 1112 via a communications link such as a LAN, WAN, telecommunications link, or any other communications link known to persons skilled in the relevant arts. Computer system 1112 is able to control the operation of the automated gates in a manner that enables the egress of people to be restricted. Such gates are well known to persons skilled in the relevant arts.

Figure 18:
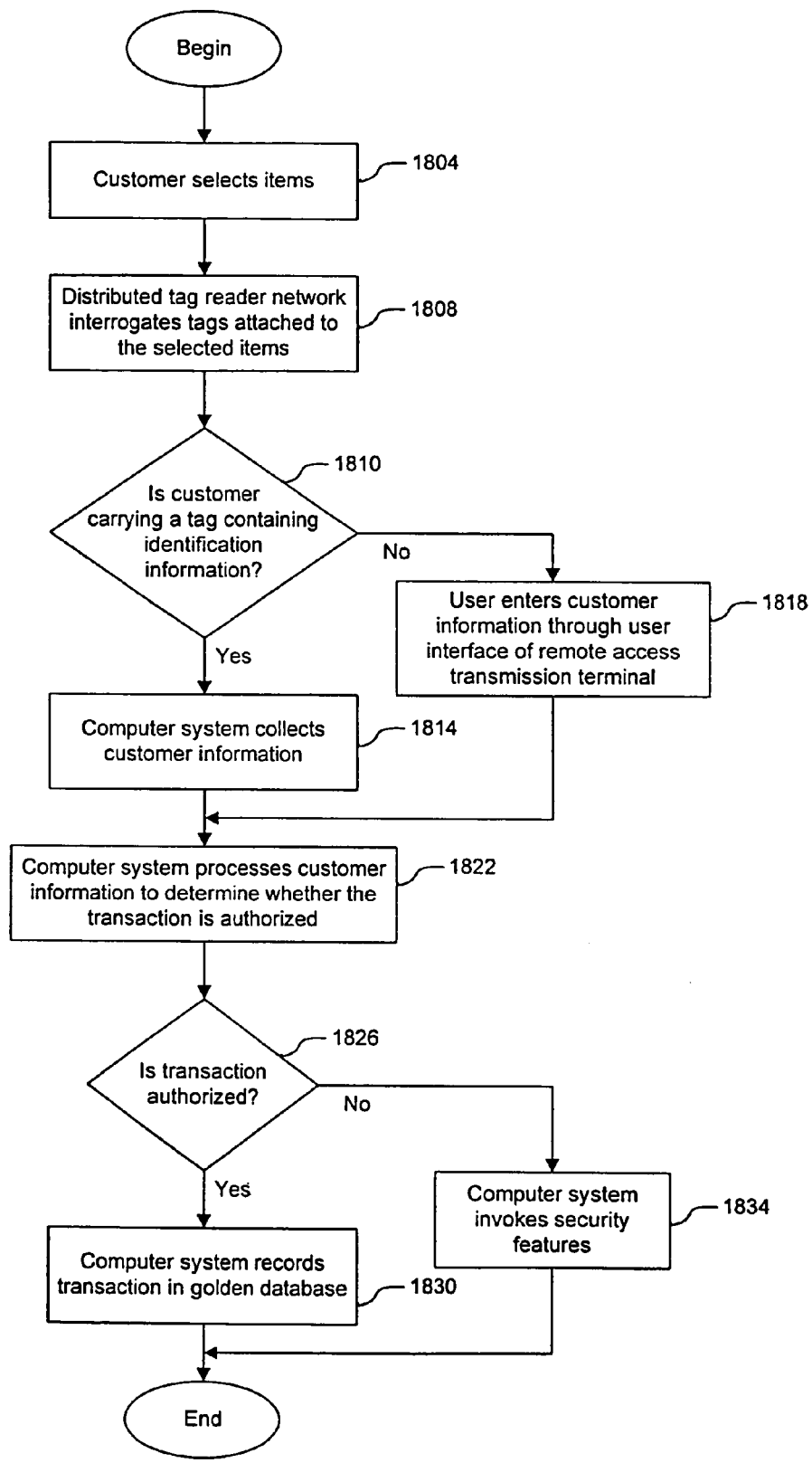
FIG. 18 is a flowchart that illustrates the operation of an automated transaction according to a preferred embodiment.

FIG. 18 is a flowchart that illustrates the operation of an automated transaction according to a preferred embodiment. The automated transaction begins with step 1804. In this step, a customer selects inventory items. A customer is anyone who desires to gain permanent or temporary control of the selected items. For example, a customer could be a library patron, a retail customer, a person loading or unloading a truck in a warehouse, medical personnel desiring to take pharmaceuticals from a secure area, or an employee desiring to take equipment from a storeroom. Items include tangible objects that are able to have a tag 102 affixed to them. Step 1804 comprises the step of taking items to a designated transaction location.

In a preferred embodiment, the designated transaction location is an area that contains a remote access transmission terminal 1124 and one or more coverage patterns 1304. The designated transaction location can be located in a structure, such as a kiosk, to provide user privacy and clearly defined coverage patterns 1304. Alternatively, the designated transaction location can be against a wall or in any area well suited for transactions.

Next, in step 1808, distributed tag reader network 1100 interrogates tags 102 attached to the selected items via network reader 1120, sensor information module 1108, and one or more remote access sensor modules 1104. In one embodiment, this step comprises performing interrogations through each of the remote access sensor modules 1104 that cover the designated transaction location according to the timed broadcast read mode of operation. Therefore, this step comprises performing the steps described above with reference to FIGS.

2, 5, 6, and 7. However, instead of reader 104 communicating with tags 102 directly, the steps in FIGS. 2, 5, 6, and 7 are performed by network reader 1120 communicating with tags 102 through one or more remote access sensor modules 1104. Step 1808 also includes operating according to the instruction set described above.

In another embodiment, step 1808 comprises performing interrogations according to the immediate read mode of operation as described above. In addition, step 1808 may be performed according to any other mode, protocol, and/or scheme that is known to persons skilled in the relevant arts. The interrogations performed pursuant to this step preferably employ the instruction set described above.

Step 1808 includes the step of storing the information collected from the interrogation of tags 102 attached to the selected items. This information can be stored in computer system 1112, internal database 1121, and/or golden database 1116.

Step 1810 is performed next. In this step, remote access transmission terminal 1124 determines whether the customer is carrying an identification card that includes a tag 102 containing identification information. In a preferred embodiment, this step comprises conducting a customer interrogation through the remote access sensor modules 1104 covering the designated transaction location. This interrogation may be performed according to the timed broadcast mode of operation described above with reference to FIGS. 2, 5, 6 and 7. However, other modes of operation, such as the immediate read mode described above, may be used. If network reader 1120 receives a customer ID from a tag 102, then step 1814 is performed, otherwise, step 1818 is performed.

In step 1814, computer system 1112 collects customer information. Customer information includes a customer ID and authentication information. As described above, a customer ID is a tag ID that uniquely identifies the customer. Authentication information corresponds to a customer ID, and is used as a security feature. Examples of authentication information include passwords and personal identification numbers (PINs). Step 1814 includes the steps of computer system 1112 accessing the customer ID received in step 1810. Step 1814 further includes the steps of computer system 1112 receiving authentication information that is entered by the customer through user interface 1125 of remote access transmission terminal 1124.

If the customer is not carrying such an identification card, step 1818 is performed. In this step, the customer enters customer information through user interface 1125 of remote access transmission terminal 1124. As stated above, customer information includes a customer ID and authentication information. In a preferred embodiment, for each customer ID, golden database 1116, internal database 1121, and/or a remote database contains a static authentication record. Each of these static authentication records preferably contains a PIN.

After either step 1814 or step 1818 is performed, step 1822 is performed. In this step, computer system 1112 processes the customer information to determine whether the transaction is authorized. For example, this step may determine that the customer does not have the required authority to obtain control of the selected items, or the selected items may be invalid transaction items. Invalid transaction items are inventory items that are not allowed to be purchased; rented, or borrowed. Library reference materials are examples of invalid transaction items. In a preferred embodiment, golden database 1116, internal database 1121, and/or a remote database contains a static record for each inventory tag ID that indicates whether the inventory item associated with the tag ID is a valid transaction item. Alternatively, this step may determine that the customer does not have sufficient financial credentials to purchase the selected items, or may have overdue borrowed items. In the case of a video rental store, the customer may not be old enough to rent videos having certain ratings such as PG-13 and R. Circumstances such as these could prevent the requested transaction from being authorized. In performing this step, computer system 1112 may interact with remote computer systems, golden database 1116, internal database 1121, as well as other information systems to obtain information necessary to make an authorization decision.

In a preferred embodiment, for each customer ID, golden database 1116 and/or internal database 1121 contains static records that computer system 1112 accesses to perform step 1822. Table 1 lists and describes an exemplary set of these static records associated with each customer ID.

TABLE 1

| Static Record | Description |
| --- | --- |
| Customer Name | Provides the customer's name. |
| Restrictions | Provides transaction restrictions such as PG-13 or R movie rentals allowed. |
| Account number | Provides a number for an account such as a store account or a credit card account. |
| Store | For a chain store, provides the identity of the store where the customer generally conducts business. |

In step 1826, computer system 1112 checks whether the transaction is authorized. If the transaction is authorized, then step 1830 is performed. Otherwise, step 1834 is performed. In step 1830, computer system 1112 completes the transaction by recording the transaction in golden database 1116, internal database 1121, and/or a remote database. In a preferred embodiment, recording the transaction comprises the steps of updating dynamic records, such as the customer and location records described above with reference to FIG. 10B. In step 1834, computer system 1112 invokes one or more security actions. Examples of security actions include turning on a surveillance camera, activating an audible alarm, activating a silent alarm, sending a silent page to management or security personnel, and activating an automated gate or turnstile to obstruct the customer's egress from a bounded area. As described above with respect to FIG. 10C, for each inventory tag ID golden database 1116, internal database 1121, and/or a remote database can contain static security action records that indicate the appropriate security actions for a particular tag ID.

8. Portable Tag Reader System

Figure 19:
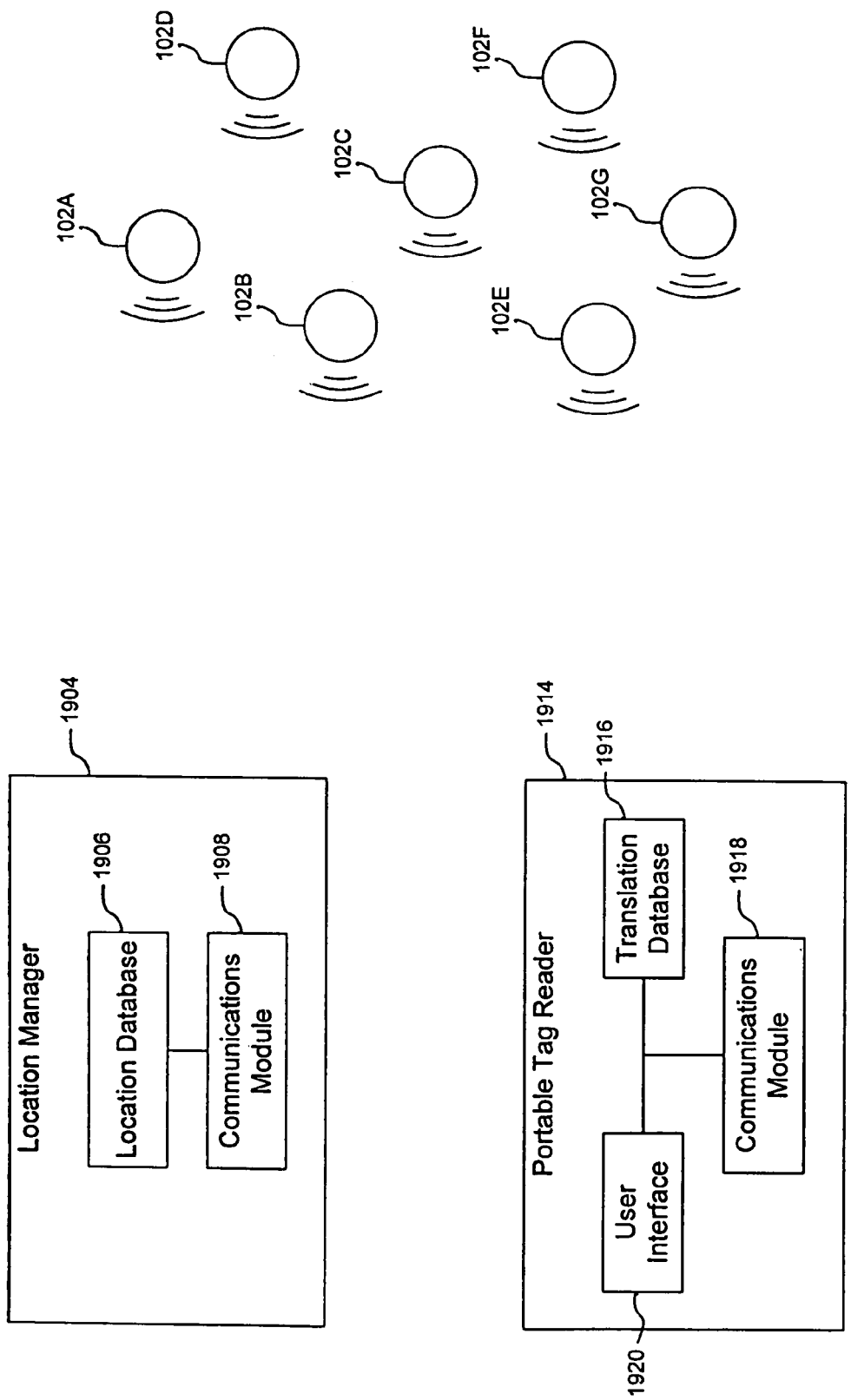
FIG. 19 illustrates a portable tag reader system.

FIG. 19 illustrates a portable tag reader system 1900 according to the present invention. Portable tag reader system 1900 enables persons to carry portable tag readers through different areas and collect information regarding tags 102 located in these areas. In a preferred embodiment, portable tag reader system 1900 enables blind and sight impaired people to ascertain information regarding their location. In addition, portable tag reader system 1900 enables the navigation of autonomous and robotic vehicles.

Portable tag reader system 1900 comprises a location manager 1904, a portable tag reader 1914, and a plurality of tags 102.

Location manager 1904 provides portable tag readers 1914 with information regarding tags 102 that are within a defined area. Location manager 1904 comprises a location database 1906 and a communications module 1908. Location database 1906 includes data records that contain descriptive information associated with each tag 102 within a defined area. In a preferred embodiment, each tag 102 is attached to a landmark and the descriptive information describes this landmark. Descriptive information can be in various formats such as text, graphics, and digital audio and voice signals. In a preferred embodiment, this descriptive information associates the relevant features of a particular tag 102 with its tag ID. For instance, if a tag 102 is near a landmark such as a door, a traffic intersection, or a street curb, the corresponding location database 1906 record contains descriptive information of this landmark. In essence, this record contains information describing the identity of the landmark.

Communications module 1908 enables location manager 1904 to communicate with portable tag reader 1914. In a preferred embodiment, location manager 1904 communicates with portable tag reader 1914 according to any wireless RF communications technique that is known to persons skilled in the relevant arts. However, in alternate embodiments, other communications techniques can be employed such as wireless optical communications, and communications via well known physical interfaces such as smart card interfaces and cable connections.

Communications module 1908 facilitates the transfer of records from location database 1906 to translation database 1916 in portable tag reader 1914. In a preferred embodiment, this transfer involves a one-way broadcast from location manager 1904 to one or more portable tag readers 1914. This broadcast transmits the identity of location manager 1904 as well as the contents of location database 1906. However, in alternate embodiments, location manager 1904 may engage in bidirectional communication with one or more portable tag readers 1914. For example, communications module 1908 of location manger 1904 may not transmit information until it receives a request from a portable tag reader 1914 to do so.

In a preferred embodiment, location manager 1904 is a personal computer system comprising a processor, memory, software, and peripherals that enable wireless communications with portable tag reader 1914. In alternate embodiments, location manager 1904 is any combination of hardware, firmware, and/or software.

Portable tag reader 1914 comprises translation database 1916, communications module 1918, and user interface 1920. Translation database 1916 includes records downloaded from location database 1906. As stated above, these records contain descriptive information associated with each tag 102 within a defined area. In a preferred embodiment, these records are indexed by tag ID.

User interface 1920 outputs descriptive information contained in translation database 1916 records. When communications module 1918 receives a tag ID from a tag 102, communications module 1918 passes this tag ID to translation database 1916. Translation database 1916 then accesses the record corresponding to this tag ID, thereby translating a tag ID into descriptive information. This descriptive information is then output by user interface 1920. This sequence of operation is described in greater detail with reference to FIG. 21 below.

In a preferred embodiment, the descriptive information stored in translation database 1916 is in the form of digitized audio signals. User interface 1920 converts these signals to analog format and plays them for a user when a tag ID is received from a tag 102. For example, if communications module 1918 receives a tag ID that is associated with a door, exemplary descriptive information corresponding to this tag ID is a voice signal declaring "this is a door." This exemplary voice signal would be converted to an analog audio signal and output for a user to hear. In alternate embodiments, the descriptive information, may be a text message that is displayed on user interface 1920, or a simple buzz or vibration signal that simply identifies that a tag 102 is nearby. These vibrations and buzzes could be different for different objects, thereby enabling a user to discern descriptive information about the landmark. This descriptive information stored in translation database may also be data that is used by an autonomous or robotic vehicle as a navigation map to identify specific landmarks that are relevant to the vehicle's navigation.

In a preferred embodiment, user interface 1920 enables the conversion of digital audio signals into analog audio signals. This feature is implemented with a digital signal processor, software, and/or electronics well known to persons skilled in the relevant arts. In addition, user interface 1920 also enables the output of audio signals. This feature is implemented with speakers and amplifier circuitry. User interface 1920 may also be a display, or a data interface that provides output data to devices such as autonomous or robotic vehicles.

Communications module 1918 enables portable tag reader 1914 to communicate with location manager 1904 and tags 102. As stated above, in a preferred embodiment, location manager 1904 and portable tag reader 1914 communicate according to any wireless RF communications technique that is known to persons skilled in the relevant arts. In alternate embodiments, location manager 1904 and portable tag reader 1914 communicate according to other techniques that include wireless optical communications, and communications via well known physical interfaces such as smart card interfaces and cable connections.

Communications module 1918 also enables portable tag reader 1914 to interrogate tags 102 according to the contention resolution techniques described above. For example, in a preferred embodiment, communications module 1918 can communicate with tags 102 according to the timed broadcast read, the immediate read, and the specific read modes of operation described above. In addition, this communications capability includes the instruction set described above. Furthermore, communications module 1918 is able to communicate with tags 102 according to various other protocols and schemes known to persons skilled in the relevant arts.

In a preferred embodiment, portable tag reader 1914 is a handheld computer system. Portable tag reader 1914 may also be a PCMCIA card. Alternatively, portable tag reader 1914 is a device that can be readily carried or worn by a user. Examples of such devices include canes, belts, eye glasses, etc. Portable tag reader 1914 can also be a plug-in module to a robotic or autonomous vehicle, where user interface 1920 passes navigation data to the vehicle. Portable tag reader 1914 is implemented with an internal processor, memory, software, and peripherals that enable wireless communications with location manager 1904. In addition, portable tag reader comprises generic circuitry as described above with reference to FIG. 4 to enable communication with tags 102 under the control of an internal processor. In alternate embodiments, portable tag reader 1914 is any combination of hardware, firmware, and/or software to perform these functions as would be readily apparent to a person skilled in the relevant arts.

As stated above, location manager 1904 provides portable tag readers 1914 with information regarding tags 102 that are within a defined area. When portable tag reader 1914 enters a new area, its translation database 1916 may not contain records corresponding to tags 102 in this area. Therefore, portable tag reader 1914 is unable to translate tag IDs identified during interrogation into descriptive information. Thus, when portable tag reader 1914 enters a new area, it needs to download records that correspond to this area into translation database 1916. The process of downloading new records is called registration.

Figure 20:
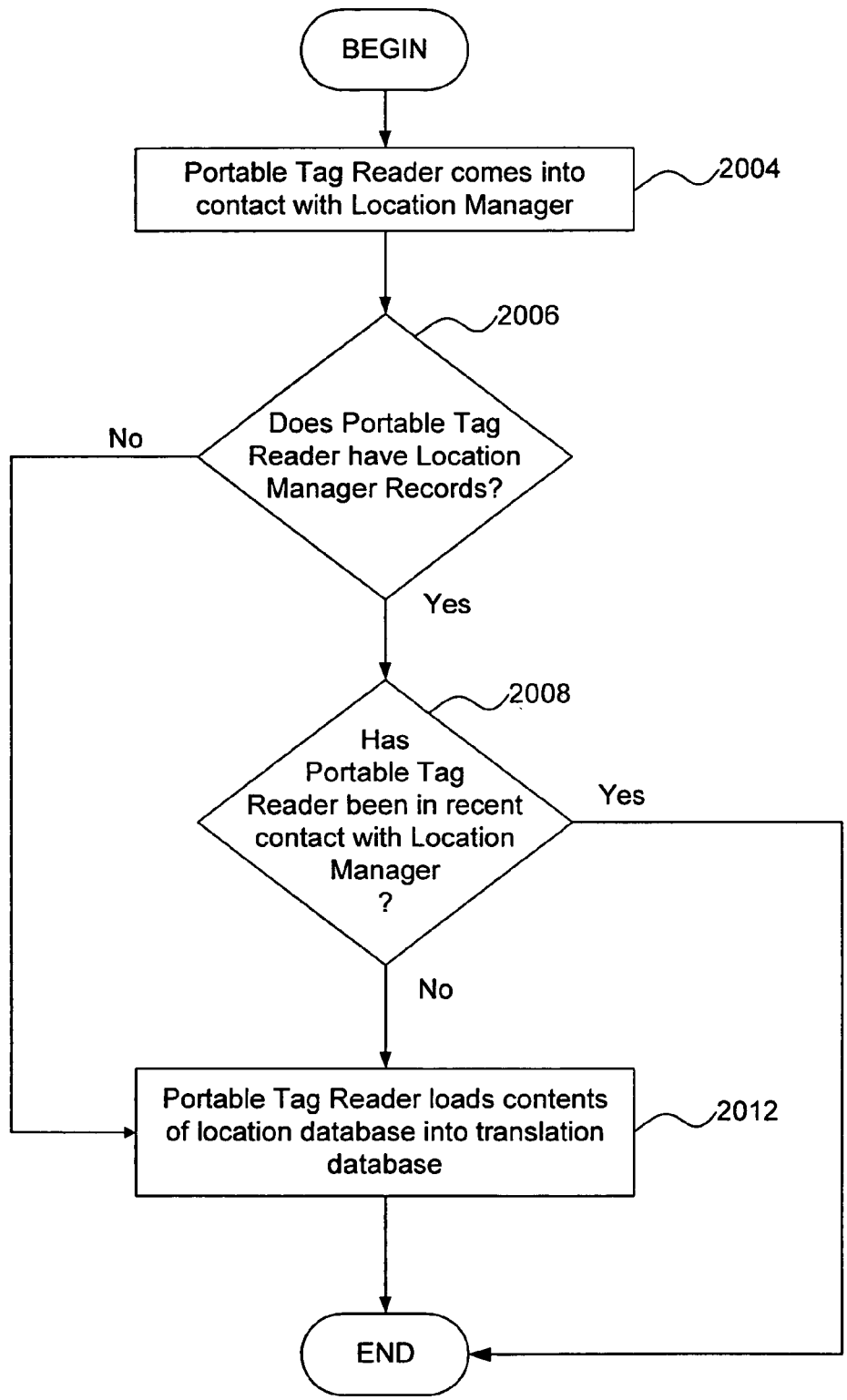
FIG. 20 is a flowchart illustrating the operation of a portable tag reader registration process according to a preferred embodiment.

FIG. 20 is a flowchart illustrating the operation of a portable tag reader registration process according to a preferred embodiment. The registration process begins with step 2004. In this step, portable tag reader 1914 comes into contact with a location manager 1904. In a preferred embodiment, contact occurs when communications module 1908 of portable tag reader 1914 receives broadcast transmissions from location manager 1904. However, in alternate embodiments, this step can comprise portable tag reader 1914 soliciting a transmission from location manager 1904 and receiving a response.

Step 2006 is performed after step 2004. In step 2006, portable tag reader 1914 determines whether its translation database 1916 contains records that are also stored in location database 1906 of location manager 1904. If portable tag reader 1914 has such records, step 2008 is performed. Otherwise, step 2012 is performed.

In step 2008, portable tag reader 1914 determines whether it has been in recent contact with location manager 1904. If portable tag reader 1914 has not been in recent contact with location manager 1904, this indicates that portable tag reader 1914 is in a new area and needs to download records corresponding to this area from location database 1906 into translation database 1916. Portable tag reader 1914 determines whether recent contact has occurred by measuring the elapsed time since the last registration with location manager 1904 occurred. If this elapsed time is greater than a refresh time parameter stored in portable tag reader 1914, then recent contact has not occurred. Similarly, if portable tag reader 1914 has never been in contact with location manger 1904, then recent contact has not occurred. In a preferred embodiment, step 2008 is performed by communications module 1918.

Step 2012 is performed if portable tag reader 1914 has not been in recent contact with location manager 1904. Otherwise, the registration process is complete. In step 2012, communications module 1918 receives and loads the contents of location database 1906 into translation database 1916. In a preferred embodiment, this step is performed by reading information from a repeating broadcast transmission that is transmitted by communications module 1908 of location manager 1904. However, in an alternate embodiment, this step is performed by communications module 1918 of portable tag reader 1914 sending a request to location manager 1904 and receiving a response transmission.

Figure 21:
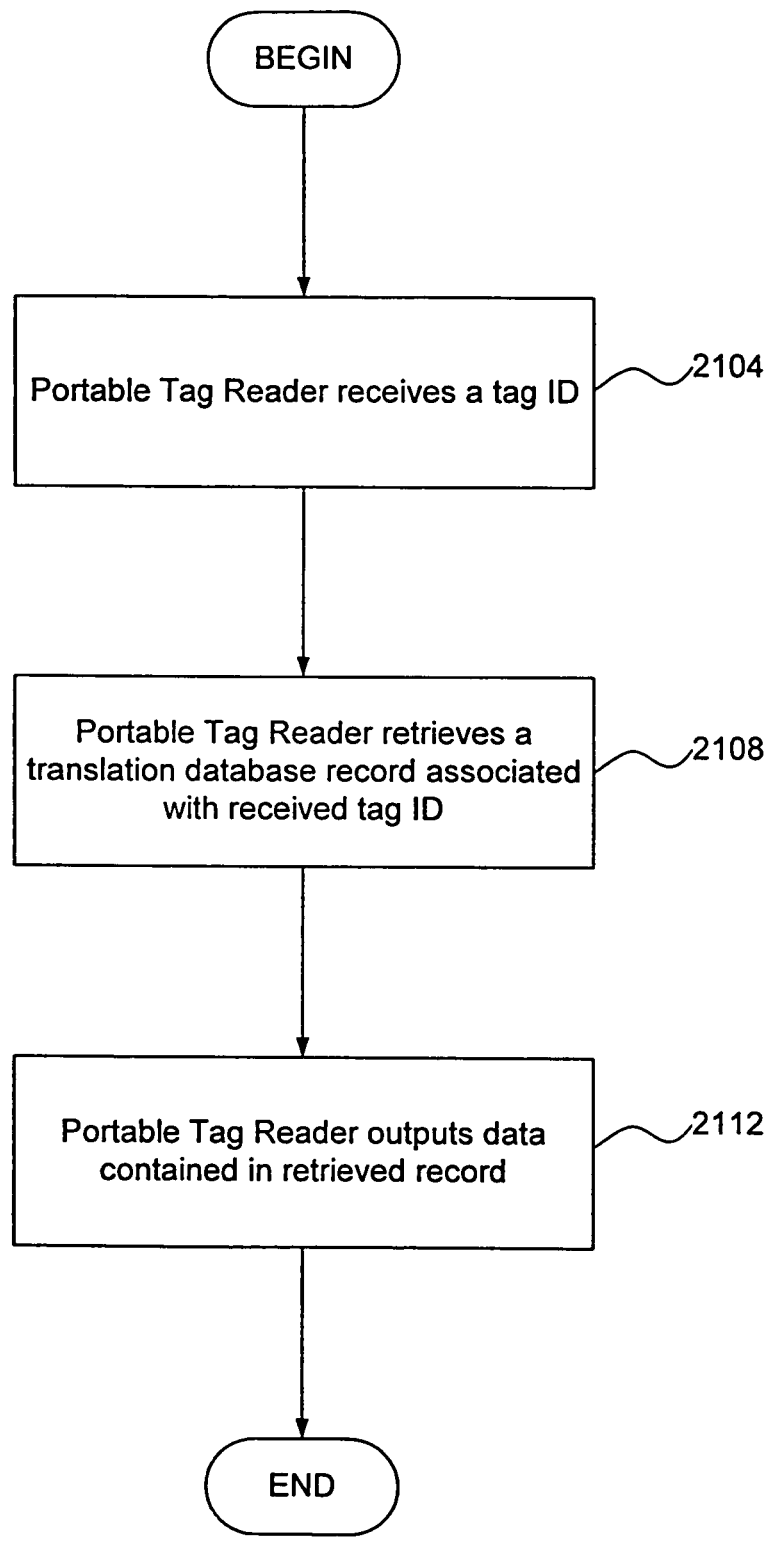
FIG. 21 is a flowchart illustrating the operation of a portable tag reader according to a preferred embodiment.

FIG. 21 is a flowchart illustrating the operation of a portable tag reader 1914 according to a preferred embodiment. This process begins with step 2104. In step 2104, communications module 1918 of portable tag reader 1914 receives a tag ID from a tag 102. In a preferred embodiment, this step comprises portable tag reader 1914 receiving a tag ID according to the immediate read mode of operation described above. In other words, this step comprises portable tag reader 1914 transmitting an instruction to a tag 102 that causes the tag 102 to bypass the time slot counting operation and to immediately transmit its tag ID number. Step 2104 may alternatively be performed according to the timed broadcast read, and specific read modes of operation described above. For the timed broadcast read mode, this step includes performing the steps described above with reference to FIGS. 2, 5, 6, and 7, and, as described above, may comprise receiving simple response signals instead of a tag ID. Step 2104 also includes operating according to the instruction set described above. In alternate embodiments, this step can be performed according to different modes, protocols, and schemes that are known to persons skilled in the relevant arts.

Step 2108 is performed next. In this step, portable tag reader 1914 retrieves a record from translation database 1916 that corresponds with the tag ID received in step 2104. As described above, the retrieved database record comprises descriptive information. In a preferred embodiment, this descriptive information is a digitized audio signal. However, this descriptive information may be a text message, a buzz, a vibration, or map data that is relevant to an autonomous or robotic vehicle's navigation.

Step 2112 is performed after step 2108. In step 2112, portable tag reader 1914 outputs the descriptive information retrieved in step 2108. In a preferred embodiment, this descriptive information is output through user interface 1920.

9. PCMCIA Card

As described above, tag reader 104, network reader 1120, and portable tag reader 1914 may be implemented with PCMCIA cards. In these implementations, the PCMCIA card (P-card) incorporates the reader interrogation protocols, interfaces, and control functionality in a standard P-card format. The P-card's logic functions are preferably implemented with ASICS. The P-card's memory is preferably provided with SRAMs and EEPROMs for both short and long term database storage.

In a preferred embodiment, a touch pad is integrated on the surface of the P-card to provide user input, such as access control passwords, reader functionality (type of read), and/or other data that is relevant to the authorized use of the P-card. User authentication can be integrated with biometrics. Examples of biometrics include finger, pore or voice prints. Biometrics also include iris, retina, facial recognition, and/or other biometrics known to persons skilled in the relevant arts. These biometrics can be implemented with sensors that interface with processing functionality within the P-card.

In addition, the P-card can incorporate a Liquid Crystal Display (LCD) to verify input, and display operational data. The P-card may include connectors that provide snap-on antenna and external battery interfaces. Such interfaces enable the P-card to be used as a stand-alone reader for hand-held inventory of tagged items. After such use, the P-card could then be plugged back into a computer P-card interface slot. The P-card can then download any or all pertinent inventory from the P-card memory into an inventory database.

As described above, the P-card could also be used as a portable tag reader 1914 for various mobile applications. Such applications include blind navigation assistance, and navigation of various autonomous vehicles. The P-card could download records into translation database 1916 by simply plugging the P-card into a location manager 1904. Alternatively, the P-card could download these records through a wireless interface.

The P-card could also be protected from reverse engineering attempts by incorporating anti-tampering technology. When this technology detects tampering, it can destroy the P-card's functionality through techniques such as erasing the P-card's memory.

In addition, the P-card could function with other external devices such as a Global Positioning Satellite (GPS). This enables the P-card to determine its precise location. Moreover, this allows one to determine the location of inventory that is associated with the P-card. In the case of the P-card being in a vehicle, a user could communicate with the P-card through various communications media to determine where a specific item is within transit or storage. Examples of such communications media include telephone, computer modem, the Internet, web TV, radio, and other communications media known to persons skilled in the relevant arts.

10. Conclusion

While various embodiments of the present invention have been described above, it should be understood that they have been presented by way of example, and not limitation. It will be apparent to persons skilled in the relevant arts that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A method of conducting a wireless inventory of items using a network tag reader and tags, wherein a unique tag is attached to each item and each tag is permanently assigned a tag identification number (Tag ID), the method comprising the steps of:
 selecting one of a plurality of remote access sensor modules, which communicate wirelessly with the items, wherein the selected remote access sensor module comprises a coverage pattern that defines a physical area containing a plurality of items with their associated tags;
 interrogating the tags in a defined physical area through the corresponding selected remote access sensor module, thereby receiving information from the tags in the defined physical area;
 storing the information received in the interrogating step in an inventory database;
 repeating the selecting, interrogating, and storing steps for each remote access sensor module; and
 after the selecting, interrogating, and storing steps are performed for each remote access sensor module, processing the information in the inventory database, wherein the interrogating step comprises the steps of:
 at the network tag reader,
  transmitting through the selected remote access sensor module a wake-up signal followed by a first clock signal;
 at each tag within the physical area defined by the coverage pattern of the selected remote access sensor module,
  incrementing a first tag count in response to the first clock signal, and
  transmitting the Tag ID assigned to each tag when the Tag ID of each tag corresponds to the first tag count;
 at the network tag reader,
  incrementing a first reader count in response to the first clock signal,
  storing a given first reader count when more than one tag responds to the first clock signal that corresponds to the given first reader count, and
  transmitting through the selected remote access sensor module the given first reader count followed by a second clock signal; and
 at each tag that responds to the transmitted given first reader count,
  incrementing a second tag count in response to the second clock signal, and
  transmitting a second number assigned to each tag when the second number of each tag corresponds to the second count.

2. The method of claim 1, wherein the information received in the interrogating step comprises at least one Tag ID, each Tag ID corresponding to a tag within the physical area defined by the coverage pattern.

3. The method of claim 2, further comprising the step of repeating the selecting, interrogating, storing, repeating, and processing steps.

4. The method of claim 3, wherein the storing step comprises the step of:
 if a particular Tag ID received during an initial performance of the interrogating step has not been received during a subsequent performance of the interrogating step within a predetermined time period, storing information in the inventory database that indicates a tag corresponding to the particular Tag ID is missing.

5. The method of claim 4, wherein the processing step comprises the step of initiating a security action when the particular Tag ID is missing.

6. The method of claim 5, wherein the security action comprises at least one of turning on a surveillance camera or activating a silent alarm.

7. The method of claim 2, wherein the processing step comprises the step of correlating a remote access sensor module identity with each Tag ID received in the interrogating step to maintain data regarding the location of each tag corresponding to a Tag ID.

8. The method of claim 1, wherein the information received in the interrogating step comprises sensor information originated by a sensor associated with a tag within the physical area defined by the coverage pattern.

9. The method of claim 8, wherein the sensor information indicates at lease one of tag movement, vibration, or temperature.

10. The method of claim 1, wherein the network tag reader is connected to each of the plurality of remote access sensor modules through an electrical power distribution system.

11. The method of claim 1, further including the step of performing multiple reads of the tags by the network tag reader to avoid time slot contention, wherein the tag identification number includes a plurality of bits, wherein a tag responds to the network tag reader with a first plurality of the plurality of bits during a first read and a second plurality of the plurality of bits during a second read.

12. A method of conducting a wireless inventory of items in a distributed tag reader network, wherein a tag is attached to each item, and wherein each tag is assigned a plurality of identification numbers, the method comprising the steps of:
 selecting at least one remote access sensor module from a plurality of remote access sensor modules in the distributed tag reader network, wherein each remote access sensor module communicates wirelessly with the tags, and each remote access sensor module has a coverage pattern that defines a physical area;
 transmitting, through the at least one selected remote access sensor module, an interrogation signal to one or more tags, wherein the one or more tags are within the physical area defined by the coverage pattern of the at least one selected remote access sensor, and wherein each tag is configured to receive the interrogation signal, evaluate one or more of its plurality of identification numbers, and reply to the interrogation signal, if appropriate;
 resolving contention between multiple tags that responded to the interrogation signal, if appropriate;
 identifying which tags are within the coverage area of the at least one selected remote access module; and
 maintaining a record of each tag that was identified.

13. The method of claim 12, wherein each reply received comprises at least one of the identification numbers assigned to the tag that responded to the interrogation signal.

14. The method of claim 13, further comprising the step of associating the at least one of the identification numbers assigned to the tag that responded to the interrogation signal with at least one of the selected remote access sensors to maintain data regarding a location of the tag.

15. The method of claim 12 further comprising the step of repeating the steps of selecting, transmitting, resolving, identifying, and maintaining for each remote access sensor module in the distributed tag reader network.

16. The method of claim 15, wherein each reply received comprises at least one of the identification numbers assigned to the tag that responded to the interrogation signal, and further comprising, if a particular identification number received in response to an initial performance of the transmitting step has not been received during a subsequent performance of the transmitting step within a predetermined time period, storing information that indicates a tag corresponding to the particular identification number is missing.

17. The method of claim 16, further comprising initiating a security action when the tag corresponding to the particular identification number is missing.

18. The method of claim 17, wherein the security action comprises turning on a surveillance camera or activating a silent alarm.

19. The method of claim 12, wherein each reply received comprises sensor information originated by a sensor associated with the tag that responded to the interrogation signal.

20. The method of claim 19, wherein the sensor information indicates at least one of the following: tag movement, tag vibration, or tag temperature.

21. The method of claim 19, further comprising analyzing the sensor information for a condition that indicates a security breach.

22. The method of claim 21, wherein the condition that indicates a security breach comprises a temperature fluctuation, a movement or a sudden vibration.

23. The method of claim 12, wherein the coverage patterns of each of the plurality of remote access sensor modules are physically isolated from each other.

24. The method of claim 12, wherein at least two of the coverage patterns of the plurality of remote access sensor modules overlap each other.

25. The method of claim 12, wherein the step of resolving contention comprises performing multiple reads on the multiple tags that responded to the interrogation signal in a same time slot by transmitting at least a second interrogation signal to the multiple tags that responded to the interrogation signal in a same time slot, wherein at least one identification number assigned to a tag includes a plurality of bits, and wherein the multiple tags that responded to the interrogation signal in the same time slot responded to the interrogation signal with a first plurality of the plurality of bits during a first read, and will respond to the second interrogation signal with a second plurality of the plurality of bits during a second read.

26. A distributed tag reader network used to conduct a wireless inventory of items, wherein a tag is attached to each item, and wherein each tag is assigned a plurality of identification numbers, and each tag is configured to receive and transmit signals, the distributed tag reader network comprising:
a network reader, comprising a database; and
a plurality of remote access sensor modules coupled to the network reader, wherein each remote access sensor module has a coverage pattern that defines a physical area, and communicates wirelessly with the tags, wherein the network reader selects at least one remote access sensor module from the plurality of remote access sensor modules in the distributed tag reader network; and
transmits, through the at least one selected remote access sensor module, an interrogation signal to one or more tags, wherein the one or more tags are within the physical area defined by the coverage pattern of the at least one selected remote access sensor, and wherein each tag is configured to receive the interrogation signal, evaluate one or more of its plurality of identification numbers, and reply to the interrogation signal, if appropriate;
wherein the network reader or the at least one selected remote access sensor module resolves contention between multiple tags that responded to the interrogation signal; and identifies which tags are within the coverage area of the selected remote access module; and
wherein the network reader maintains a record of each tag that was identified in its database.

27. The distributed tag reader network of claim 26 further comprising a computer system coupled to the network reader, and wherein the network reader selects at least one remote access sensor module from a plurality of remote access sensor modules in the distributed tag reader network in response to an instruction received from the computer system.

28. The distributed tag reader network of claim 26 further comprising a computer system coupled to the network reader on a permanent basis via a wired connection.

29. The distributed tag reader network of claim 26 further comprising a computer system coupled to the network reader on an intermittent basis via a wireless connection.

30. The distributed tag reader network of claim 26 further comprising a computer system, wherein the network reader is a Personal Computer Memory Card International Association (PCMCIA) card that fits into a PCMCIA card slot on the computer system.

31. The distributed tag reader network of claim 29 wherein the computer system is a portable device.

32. The distributed tag reader network of claim 26 further comprising a computer system, coupled to the network reader, that is capable of controlling the performance of the network reader.

33. The distributed tag reader network of claim 26 further comprising a computer system coupled to the network reader, and wherein the computer system is a desktop computer, a workstation, a personal digital assistant, dedicated hardware, dedicated firmware or dedicated software.

34. The distributed tag reader network of claim 26 further comprising a sensor information module, coupled to the network reader and to the plurality of remote access sensor modules, configured to facilitate an exchange of information between the reader network, the plurality of remote access sensor modules and the plurality of tags.

35. The distributed tag reader network of claim 26, wherein the network tag reader is connected to each of the plurality of remote access sensor modules through an electrical power distribution system.

36. The distributed tag reader network of claim 26, wherein at least one of the remote access sensor modules is a Personal Computer Memory Card International Association (PCMCIA) card.

37. The distributed tag reader network of claim 26, wherein at least one of the remote access sensor modules attaches to an electrical lighting fixture.

* * * * *

UNITED STATES PATENT AND TRADEMARK OFFICE
CERTIFICATE OF CORRECTION

| | | |
|---|---|---|
| PATENT NO. | : 7,844,505 B1 | Page 1 of 1 |
| APPLICATION NO. | : 09/496960 | |
| DATED | : November 30, 2010 | |
| INVENTOR(S) | : Arneson et al. | |

It is certified that error appears in the above-identified patent and that said Letters Patent is hereby corrected as shown below:

In Fig. 7, Sheet 10 of 28, for Tag "722" delete "NO?" and insert -- NO.? --, therefor.

In Column 12, Line 3, delete "a electrolytic" and insert -- an electrolytic --, therefor.

In Column 33, Line 62, delete "purchased;" and insert -- purchased, --, therefor.

In Column 40, Line 2, in Claim 2, delete "one Tag ID, each Tag ID" and insert -- a first plurality of the plurality of bits --, therefor.

In Column 40, Line 10, in Claim 4, delete "Tag ID" and insert -- first plurality of the plurality of bits corresponding to a tag --, therefor.

In Column 40, Line 14, in Claim 4, delete "a".

In Column 40, Line 15, in Claim 4, delete "Tag ID" and insert -- first plurality of bits --, therefor.

In Column 40, Line 18, in Claim 5, delete "Tag ID" and insert -- first plurality of bits --, therefor.

In Column 40, Line 24, in Claim 7, delete "Tag ID" and insert -- of the first plurality of bits --, therefor.

In Column 40, Line 26, in Claim 7, delete "a Tag ID" and insert -- each of the plurality of bits --, therefor.

In Column 40, Line 32, in Claim 9, delete "lease" and insert -- least --, therefor.

In Column 40, Lines 39-40, in Claim 11, delete "wherein the tag identification number includes a plurality of bits,".

In Column 42, Line 36, in Claim 31, delete "29" and insert -- 30 --, therefor.

Signed and Sealed this
Eighteenth Day of December, 2012

David J. Kappos
*Director of the United States Patent and Trademark Office*